United States Patent
Nio

(10) Patent No.: US 7,880,980 B2
(45) Date of Patent: Feb. 1, 2011

(54) IMAGING LENS, AND IMAGING DEVICE AND MOBILE TERMINAL APPARATUS USING THE SAME

(75) Inventor: Junichi Nio, Narashino (JP)

(73) Assignee: Seiko Precision, Inc., Chiba (JP)

( * ) Notice: Subject to any disclaimer, the term of this patent is extended or adjusted under 35 U.S.C. 154(b) by 0 days.

(21) Appl. No.: 12/520,751

(22) PCT Filed: Dec. 21, 2007

(86) PCT No.: PCT/JP2007/074732
§ 371 (c)(1),
(2), (4) Date: Jun. 22, 2009

(87) PCT Pub. No.: WO2008/078708
PCT Pub. Date: Jul. 3, 2008

(65) Prior Publication Data
US 2010/0014175 A1    Jan. 21, 2010

(30) Foreign Application Priority Data
Dec. 22, 2006    (JP) ............... 2006-346318

(51) Int. Cl.
*G02B 9/34*    (2006.01)
(52) U.S. Cl. ............... 359/773; 359/715; 359/738; 359/740
(58) Field of Classification Search ........... 359/715, 359/738, 740, 772, 773
See application file for complete search history.

(56) References Cited

U.S. PATENT DOCUMENTS 7,321,474 B1 *   1/2008   Jo ................. 359/773
7,561,347 B2 *   7/2009   Park et al. ......... 359/773

FOREIGN PATENT DOCUMENTS

| JP | 2002-365529 | 12/2002 |
| JP | 2006-267570 | 10/2006 |
| JP | 2007-017984 | 1/2007 |
| JP | 2007-219079 | 8/2007 |
| JP | 2007-264498 | 10/2007 |
| JP | 2007-286153 | 11/2007 |
| WO | 2008078708 | 7/2008 |

OTHER PUBLICATIONS

International Search Report for PCT/JP2007/074732 mailed on Jan. 29, 2008.

* cited by examiner

*Primary Examiner*—Evelyn A. Lester
(74) *Attorney, Agent, or Firm*—Howard & Howard Attorneys PLLC

(57) ABSTRACT

A first lens (L1), a second lens (L2), a third lens (L3), and a fourth lens (L4) are arranged in this order from an object side. The first lens (L1) has a biconvex shape and a positive refracting power. The second lens (L2) has a meniscus shape that is convex toward the object side, and has a negative refracting power. The third lens (L3) has a meniscus shape that is convex toward an image side, and has a positive refracting power. The fourth lens (L4) has a meniscus shape that is convex toward the object side, and has a negative refracting power. A chromatic aberration generated by the first lens (L1) is corrected by the second lens (L2). A chromatic aberration generated by the third lens (L3) is corrected by the fourth lens (L4).

10 Claims, 16 Drawing Sheets

LENS CONFIGURATION OF EXAMPLE 1

LENS CONFIGURATION OF EXAMPLE 1

LENS CONFIGURATION OF EXAMPLE 2

LENS CONFIGURATION OF EXAMPLE 3

LENS CONFIGURATION OF EXAMPLE 4

LENS CONFIGURATION OF EXAMPLE 5

LENS CONFIGURATION OF EXAMPLE 6

LENS CONFIGURATION OF EXAMPLE 7

LENS CONFIGURATION OF EXAMPLE 8

LENS CONFIGURATION OF EXAMPLE 9

LENS CONFIGURATION OF EXAMPLE 10

ABERRATIONS OF EXAMPLE 1

ABERRATIONS OF EXAMPLE 2

ABERRATIONS OF EXAMPLE 3

ABERRATIONS OF EXAMPLE 4

ABERRATIONS OF EXAMPLE 5

ABERRATIONS OF EXAMPLE 6

ABERRATIONS OF EXAMPLE 7

ABERRATIONS OF EXAMPLE 8

ABERRATIONS OF EXAMPLE 9

ABERRATIONS OF EXAMPLE 10

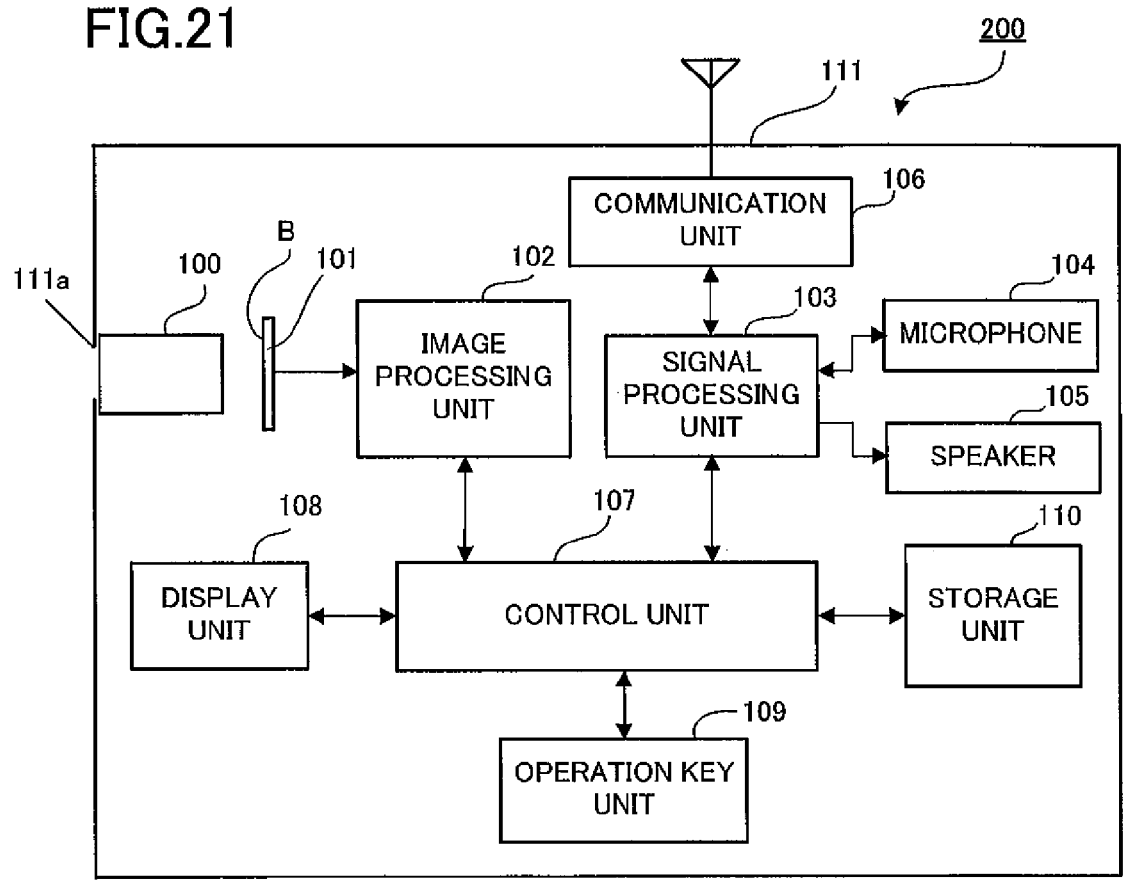

IMAGING LENS, AND IMAGING DEVICE AND MOBILE TERMINAL APPARATUS USING THE SAME

TECHNICAL FIELD

The present invention relates to an imaging lens using four lenses.

BACKGROUND ART

Recently, solid-state imaging elements for mobile cameras mounted on cellular phones, etc. have been reduced in size: solid-state imaging elements such as CCD devices, CMOS, etc. that have a pixel size of 2 μm or smaller are used.

A practically useful imaging lens, which has capabilities matching a solid-state imaging element having such a very small pixel size, is manufactured by using four lenses, and aberrations of these lenses need to be sufficiently corrected.

One example of an imaging lens that uses four lenses is disclosed in Patent Literature 1.

Patent Literature 1: Unexamined Japanese Patent Application KOKAI Publication No. 2002-365529

DISCLOSURE OF INVENTION

Problem to be Solved by the Invention

The imaging lens disclosed in Patent Literature 1 has a large numeric aperture, and its astigmatism and distortion aberration are finely corrected. However, its imaging performance is poor because its spherical aberration and coma aberration are not completely corrected. Furthermore, the imaging lens is not successfully reduced in its allover length.

The present invention was made in view of this problem, and an object of the present invention is to realize an imaging lens that has a small size and yet whose aberrations are finely corrected.

Means for Solving the Problem

To achieve the above object, an imaging lens according to an aspect of the present invention includes a first lens, a second lens, a third lens, and a fourth lens that are arranged in this order from an object side.

The first lens has a biconvex shape and a positive refracting power.

The second lens has a meniscus shape that is convex toward the object side, and has a negative refracting power.

The third lens has a meniscus shape that is convex toward an image side, and has a positive refracting power.

The fourth lens has a meniscus shape that is convex toward the object side, and has a negative refracting power.

It is preferred that the imaging lens satisfy the following conditional expressions (1) to (5).

$$1.3 < f/f1 < 1.8 \quad (1),$$

$$1.1 < f/f3 < 2.15 \quad (2),$$

$$-0.006 < 1/f1v1 + 1/f2v2 < 0 \quad (3),$$

$$0 < 1/f3v3 + 1/f4v4 < 0.002 \quad (4), \text{ and}$$

$$0.15 < T23/TTL < 0.25 \quad (5),$$

Where
- f: integral focal length of an entire lens system,
- f1: focal length of the first lens,
- f2: focal length of the second lens,
- f3: focal length of the third lens,
- f4: focal length of the fourth lens,
- v1: Abbe number of a d-line of the first lens,
- v2: Abbe number of a d-line of the second lens,
- v3: Abbe number of a d-line of the third lens,
- v4: Abbe number of a d-line of the fourth lens,
- T23: air distance between the second lens and the third lens, and
- TTL: distance between an apex of the first lens and an image formation plane.

An aperture stop may be arranged closer to the object side than the first lens is.

An aperture stop may be arranged between the first lens and the second lens.

It is preferred that the integral focal length f of the first lens to the fourth lens satisfies the following condition.

$$4.426 \text{ mm} \leq f \leq 4.896 \text{ mm}$$

It is preferred that the integral F-number of the first lens to the fourth lens satisfies the following condition.

$$2.8 \leq F \leq 3.0$$

It is preferred that the integral field angle 2ω of the first lens to the fourth lens satisfies the following condition.

$$58.9° \leq 2\omega \leq 67.9°$$

A parallel-plate glass may be arranged between the fourth lens and the image formation plane.

An imaging device may be constituted by the imaging lens described above, and an imaging element that converts an object image formed by the imaging lens into an electric signal.

A mobile terminal apparatus that includes the imaging device described above may be provided.

Effect of the Invention

According to the present invention, it is possible to realize an imaging lens that has a small size and yet whose aberrations are finely corrected.

BRIEF DESCRIPTION OF DRAWINGS

FIG. 21 is an exemplary diagram showing one example of a mobile terminal apparatus having the imaging lens according to an example of the present invention.

EXPLANATION OF REFERENCE NUMERALS

L1-L4 first to fourth lenses
S aperture stop
B image plane

Best Mode for Carrying Out the Invention

An imaging lens according to the present embodiment includes a first lens L1, a second lens L2, a third lens L3, and a fourth lens L4 as will be shown in Examples 1 to 10 described below, and these lenses L1 to L4 are arranged in this order from an object side.

The first lens L1 has a biconvex shape and a positive refracting power. The second lens L2 has a meniscus shape that is convex toward the object side, and has a negative refracting power. The third lens has a meniscus shape that is convex toward the image side, and has a positive refracting power. The fourth lens has a meniscus shape that is convex toward the object side, and has a negative refracting power.

A parallel-plate glass G that is equivalent to a filter or a cover glass is arranged between the lens L4 and the image plane B.

They satisfy the following conditional expressions (1) to (5).

$$1.3 < f/f1 < 1.8 \tag{1},$$

$$1.1 < f/f3 < 2.15 \tag{2},$$

$$-0.006 < 1/f1v1 + 1/f2v2 < 0 \tag{3},$$

$$0 < 1/f3v3 + 1/f4v4 < 0.002 \tag{4}, \text{ and}$$

$$0.15 < T23/TTL < 0.25 \tag{5},$$

Where
  f: integral focal length of the entire lens system
  f1: focal length of the first lens L1,
  f2: focal length of the second lens L2,
  f3: focal length of the third lens L3,
  f4: focal length of the fourth lens L4,
  v1: Abbe number of a d-line of the first lens L1,
  v2: Abbe number of a d-line of the second lens L2,
  v3: Abbe number of a d-line of the third lens L3,
  v4: Abbe number of a d-line of the fourth lens L4,
  T23: air distance between the second lens L2 and the third lens L3, and
  TTL: distance between the apex of the first lens L1 and the image plane B.

Example 1 to Example 10 of the present embodiment will be specifically explained below based on drawings and tables.

EXAMPLE 1

Figure 1:
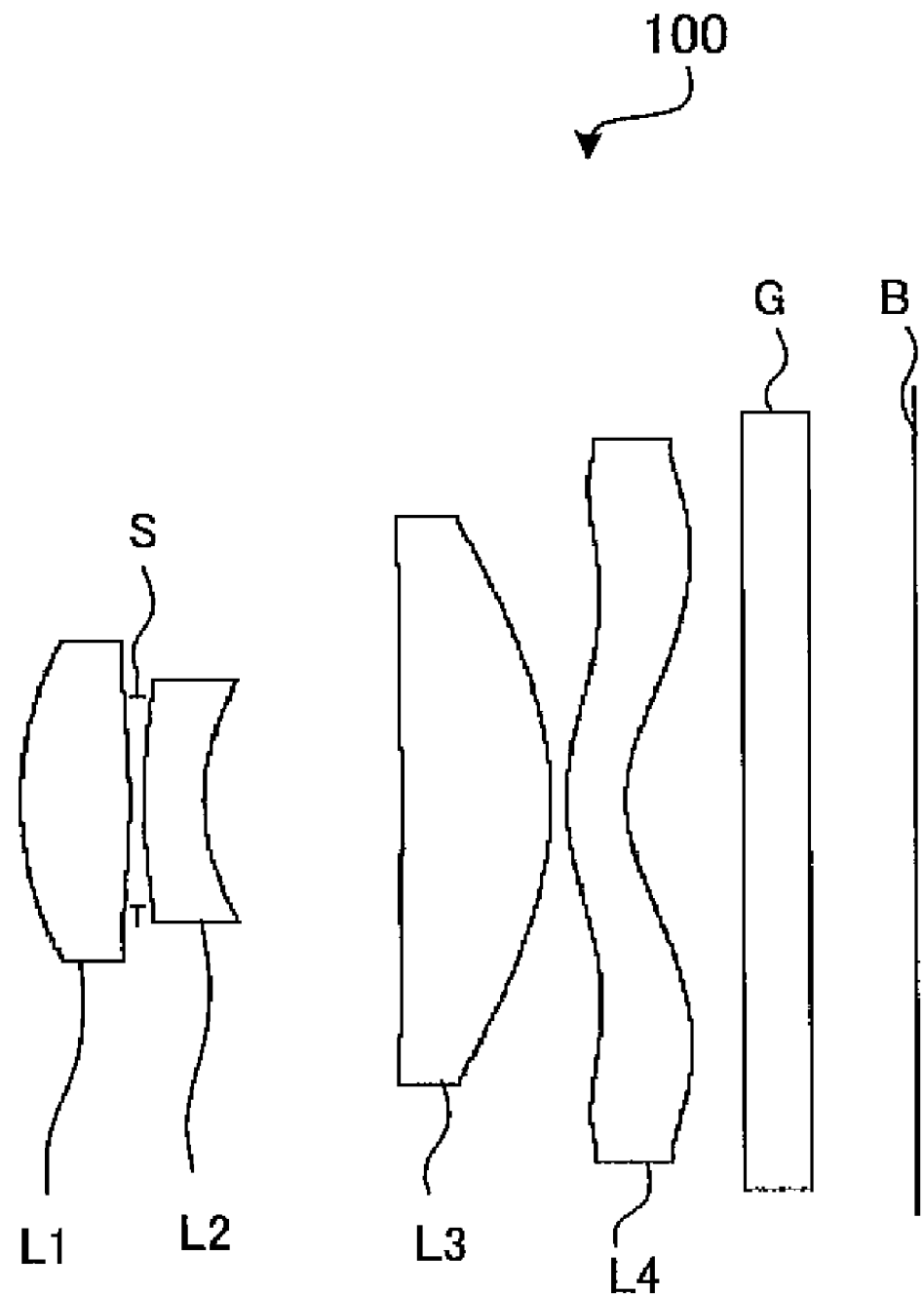
FIG. 1 is a lens configuration diagram of an imaging lens according to Example 1.

As shown in FIG. 1, the imaging lens according to Example 1 of the present invention has the following lens configuration.

Table 1 (a) shows configuration data of the imaging lens according to Example 1.

Table 1 (b) shows aspheric coefficients of the imaging lens according to Example 1.

TABLE 1 (a)

lens configuration data

| No. | r | d | nd | vd | |
|-----|-----|-----|-----|-----|-----|
| 1 | 2.194 | 0.734 | 1.53116 | 56 | first lens |
| 2 | −4.611 | 0.050 | | | |
| s3 | 0.000 | 0.050 | | | aperture stop |
| 4 | 4.636 | 0.400 | 1.607 | 27 | second lens |
| 5 | 1.358 | 1.323 | | | |
| 6 | −24.408 | 1.000 | 1.53116 | 56 | third lens |
| 7 | −2.141 | 0.100 | | | |
| 8 | 1.522 | 0.400 | 1.53116 | 56 | fourth lens |
| 9 | 0.990 | 0.802 | | | |
| 10 | 0.000 | 0.432 | 1.5168 | 64.2 | parallel-plate glass |
| 11 | 0.000 | 0.709 | | | |
| 12 | 0.000 | 0.000 | | | |

TABLE 1 (b)

cone constant and aspheric coefficients

| No. | k | α4 | α6 | α8 | α10 | α12 | α14 | α16 |
|-----|-----|-----|-----|-----|-----|-----|-----|-----|
| 1 | −0.80727984 | 0.006544714 | 0.010425042 | −0.021164833 | 0.019529995 | −0.00676939 | 0 | 0 |
| 2 | −94.659425 | 0.000373599 | 0.028600611 | −0.080253154 | 0.104116164 | −0.052413106 | 0 | 0 |
| 4 | 0 | 0.017962956 | −0.111374622 | 0.183752821 | −0.171024164 | 0.075139289 | 0 | 0 |

TABLE 1 (b)-continued

| | cone constant and aspheric coefficients | | | | | | |
|---|---|---|---|---|---|---|---|
| No. | k | α4 | α6 | α8 | α10 | α12 | α14 α16 |
| 5 | −0.652068125 | −0.096992119 | 0.075988982 | −0.076935863 | 0.07589247 | −0.032470867 | 0   0 |
| 6 | 0 | 0.033081123 | −0.023908819 | 0.006450686 | −0.000398987 | −6.5316E−05 | 0   0 |
| 7 | −0.691445282 | 0.056453829 | −0.023498503 | 0.003824763 | 0.000375586 | −0.000107973 | 0   0 |
| 8 | −4.608474081 | −0.064703953 | 0.004736974 | 0.001437091 | −0.000221078 | 1.01186E−05 | 0   0 |
| 9 | −3.060917953 | −0.070422786 | 0.015262324 | −0.002457858 | 0.000173882 | 1.77791E−06 | 0   0 |

The focal length f of the entire lens system of the imaging lens according to the present example is 4.896 mm. The F-number of the entire lens system is F3. The field angle 2ω of the entire lens system is 58.9°.

An aperture stop S is arranged between the lens L1 and the lens L2.

Each of the lenses L1 to L4 constitutes two lens surfaces, the aperture stop S constitutes one surface, and the parallel-plate glass G constitutes two surfaces. Each lens surface has curvature radius r, distance d, refractive index nd to a d-line, and Abbe number νd shown in Table 1 (a). In Table 1 (a), "No." indicates lens surface number, which is assigned in an order that starts from the object side. The lens surface number s3 indicates the aperture stop S. The distance d indicates the distance from each of the lens surface to the next lens surface.

The aspheric shape of each lens surface is expressed by the following equation (6), where the direction of the optical axis is set as z-axis, a direction orthogonal to the optical axis is set as y-axis, c is the reciprocal of the curvature radius, k is the cone constant, and $\alpha_4$, $\alpha_6$, $\alpha_8$, $\alpha_{10}$, $\alpha_{12}$, $\alpha_{14}$, and $\alpha_{16}$ are the aspheric coefficients.

[Expression 1]

$$z = \frac{cy^2}{1+\sqrt{1-(1+k)c^2y^2}} + \alpha_4 y^4 + \alpha_6 y^6 + \alpha_8 y^8 + \alpha_{10} y^{10} + \alpha_{12} y^{12} + \alpha_{14} y^{14} + \alpha_{16} y^{16} \quad (6)$$

The cone constant k and aspheric coefficients $\alpha_4$, $\alpha_6$, $\alpha_8$, $\alpha_{10}$, $\alpha_{12}$, $\alpha_{14}$, and $\alpha_{16}$ of each lens surface according to Example 1 are as shown in Table 1(b). In Table 1(b), "No." indicates the same lens surface numbers as those that are indicated in Table 1(a).

EXAMPLE 2

Figure 2:
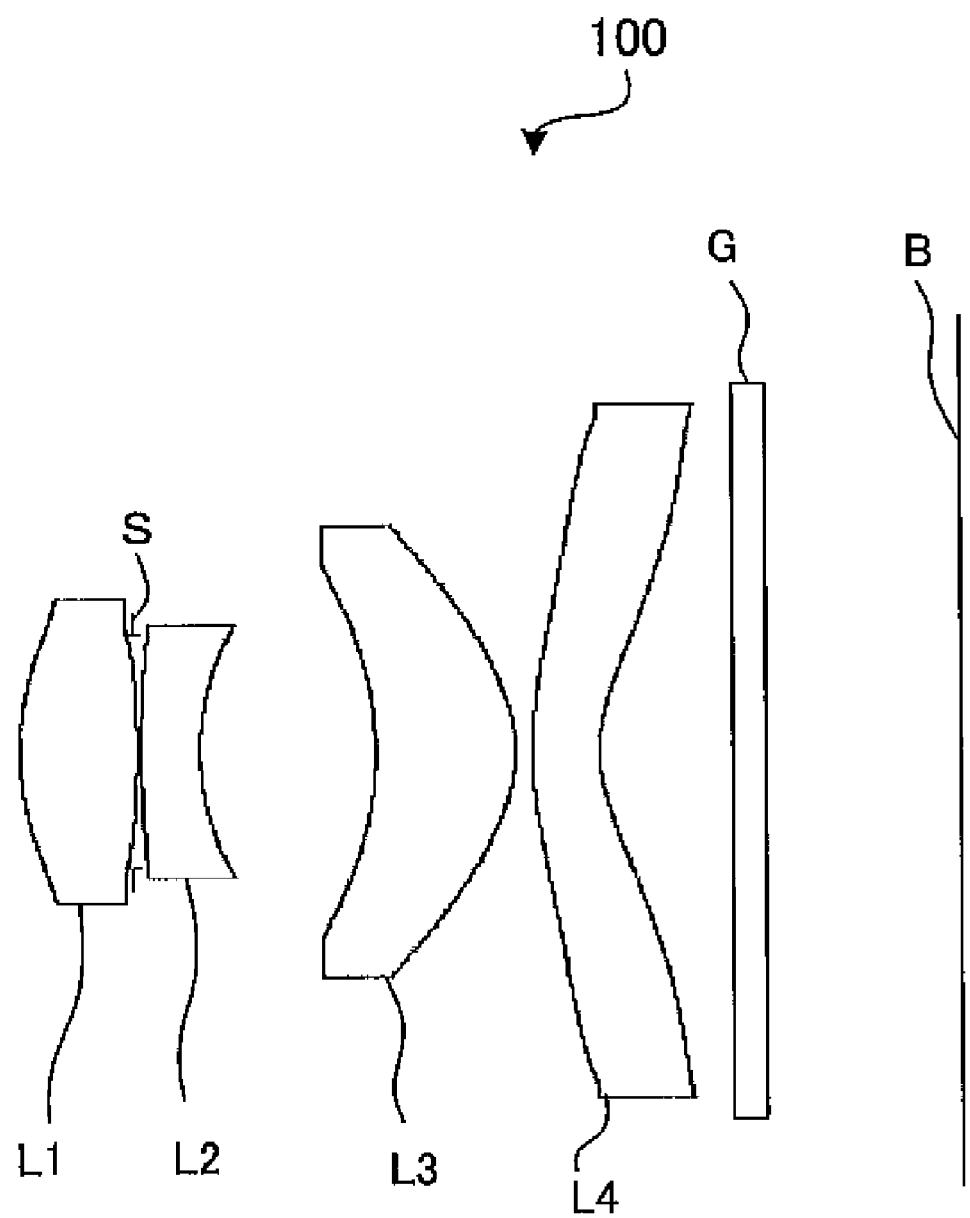
FIG. 2 is a lens configuration diagram of an imaging lens according to Example 2.

As shown in FIG. 2, the imaging lens according to Example 2 of the present invention has a lens configuration as shown below.

Table 2(a) shows configuration data of the imaging lens according to Example 2.

Table 2(b) shows aspheric coefficients of the imaging lens according to Example 2.

TABLE 2 (a)

| | lens configuration data | | | | |
|---|---|---|---|---|---|
| No. | r | d | nd | νd | |
| 1 | 1.929 | 0.697 | 1.53116 | 56 | first lens |
| 2 | −5.563 | −0.031 | | | |
| s3 | 0.000 | 0.057 | | | aperture stop |
| 4 | 8.314 | 0.350 | 1.6071 | 27 | second lens |
| 5 | 1.795 | 1.044 | | | |
| 6 | −2.318 | 0.830 | 1.53116 | 56 | third lens |
| 7 | −0.973 | 0.100 | | | |
| 8 | 2.589 | 0.400 | 1.53116 | 56 | fourth lens |
| 9 | 0.934 | 0.790 | | | |
| 10 | 0.000 | 0.210 | 1.5168 | 64.2 | parallel-plate glass |
| 11 | 0.000 | 1.154 | | | |
| 12 | 0.000 | 0.000 | | | |

TABLE 2 (b)

| | cone constant and aspheric coefficients | | | | | | | |
|---|---|---|---|---|---|---|---|---|
| No. | k | α4 | α6 | α8 | α10 | α12 | α14 | α16 |
| 1 | −1.127191648 | −0.006670998 | 0.008616198 | −0.062632899 | 0.045889939 | −0.028692444 | 0 | 0 |
| 2 | −138.4763742 | −0.038205277 | −0.052481712 | −0.020149462 | 0.071834831 | −0.046842284 | 0 | 0 |
| 4 | 0 | 0.063612236 | −0.148714159 | 0.129579108 | −0.016815423 | −0.014211629 | 0 | 0 |
| 5 | 1.484095119 | −0.021221664 | 0.012747713 | −0.047494264 | 0.047226579 | −0.024111899 | 0 | 0 |
| 6 | 0 | 0.002497543 | 0.002716365 | −0.007308997 | 0.004226195 | 0.001915025 | 0 | 0 |
| 7 | −4.148588793 | −0.079163314 | 0.022915583 | −0.002028469 | −0.001339235 | 0.000710973 | 0 | 0 |
| 8 | −7.047782722 | −0.036361748 | 0.009701441 | −0.001047301 | 8.28385E−05 | −3.80588E−06 | 0 | 0 |
| 9 | −5.429098091 | −0.030376699 | 0.006202857 | −0.001042843 | 0.000128548 | −4.96699E−06 | 0 | 0 |

The focal length f of the entire lens system of the imaging lens according to the present example is 4.739 mm. The F-number of the entire lens system is F2.8. The field angle 2ω of the entire lens system is 60.8°.

An aperture stop S is arranged between the lens L1 and the lens L2.

Each of the lenses L1 to L4 constitutes two lens surfaces, the aperture stop S constitutes one surface, and the parallel-plate glass G constitutes two surfaces. Each lens surface has curvature radius r, distance d, refractive index nd to a d-line, and Abbe number νd shown in Table 2(a). In Table 2(a), "No." indicates lens surface number, which is assigned in an order that starts from the object side. The lens surface number s3 indicates the aperture stop S. The distance d indicates the distance from each of the lens surface to the next lens surface.

The cone constant k and aspheric coefficients $\alpha_4$, $\alpha_6$, $\alpha_8$, $\alpha_{10}$, $\alpha_{12}$, $\alpha_{14}$, and $\alpha_{16}$ of each lens surface according to Example 2 are as shown in Table 2(b). In Table 2(b), "No." indicates the same lens surface numbers as those that are indicated in Table 2(a).

The focal length f of the entire lens system of the imaging lens according to the present example is 4.630 mm. The F-number of the entire lens system is F2.88. The field angle 2ω of the entire lens system is 65.2°.

An aperture stop S is arranged between the lens L1 and the lens L2.

Each of the lenses L1 to L4 constitutes two lens surfaces, the aperture stop S constitutes one surface, and the parallel-plate glass G constitutes two surfaces. Each lens surface has curvature radius r, distance d, refractive index nd to a d-line, and Abbe number νd shown in Table 3(a). In Table 3(a), "No." indicates lens surface number, which is assigned in an order that starts from the object side. The lens surface number s3 indicates the aperture stop S. The distance d indicates the distance from each of the lens surface to the next lens surface.

The cone constant k and aspheric coefficients $\alpha_4$, $\alpha_6$, $\alpha_8$, $\alpha_{10}$, $\alpha_{12}$, $\alpha_{14}$, and $\alpha_{16}$ of each lens surface according to Example 3 are as shown in Table 3(b). In Table 3(b), "No." indicates the same lens surface numbers as those that are indicated in Table 3(a).

EXAMPLE 3

Figure 3:
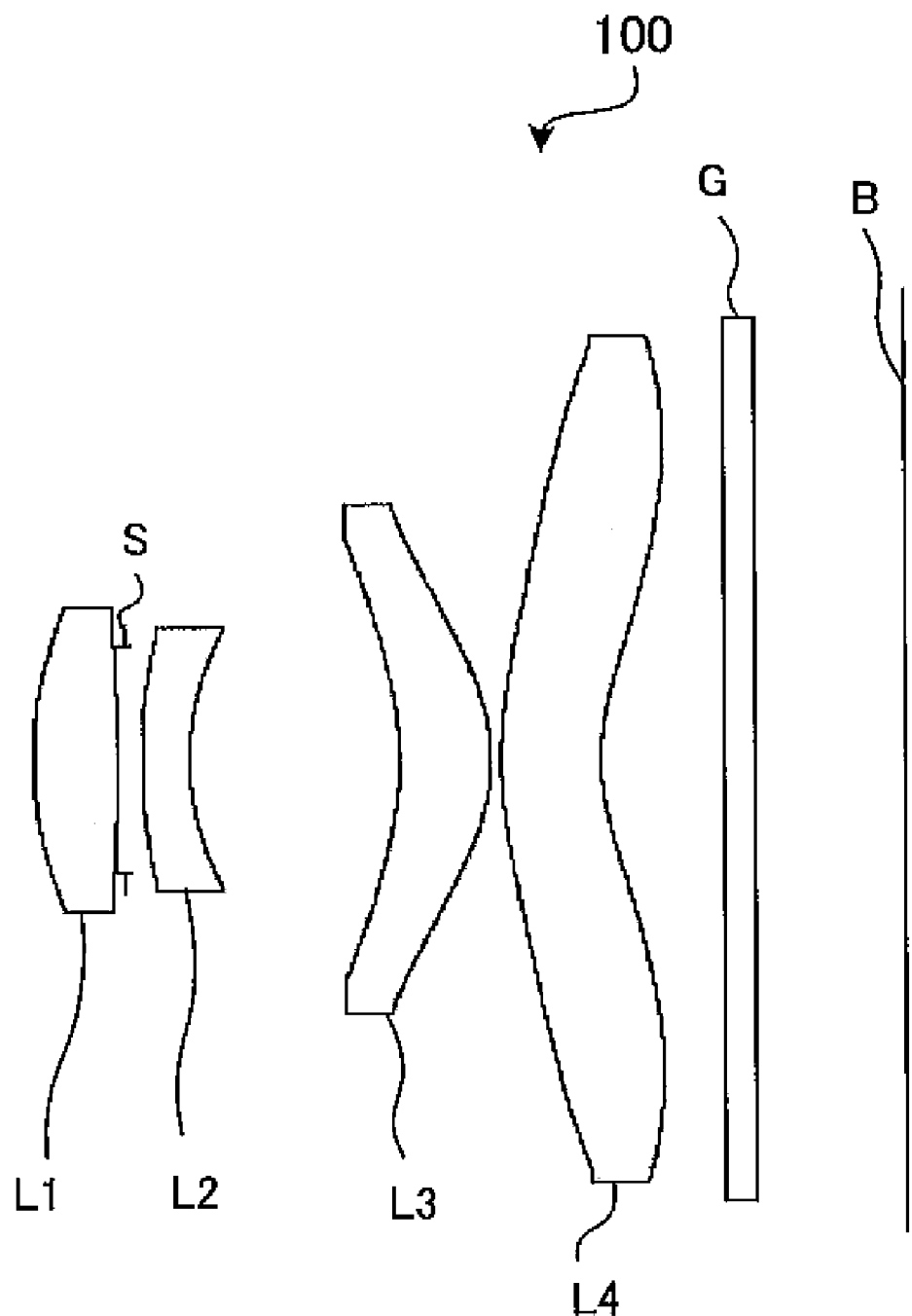
FIG. 3 is a lens configuration diagram of an imaging lens according to Example 3.

As shown in FIG. 3, the imaging lens according to Example 3 of the present invention has a lens configuration as shown below.

Table 3(a) shows configuration data of the imaging lens according to Example 3.

Table 3(b) shows aspheric coefficients of the imaging lens according to Example 3.

EXAMPLE 4

Figure 4:
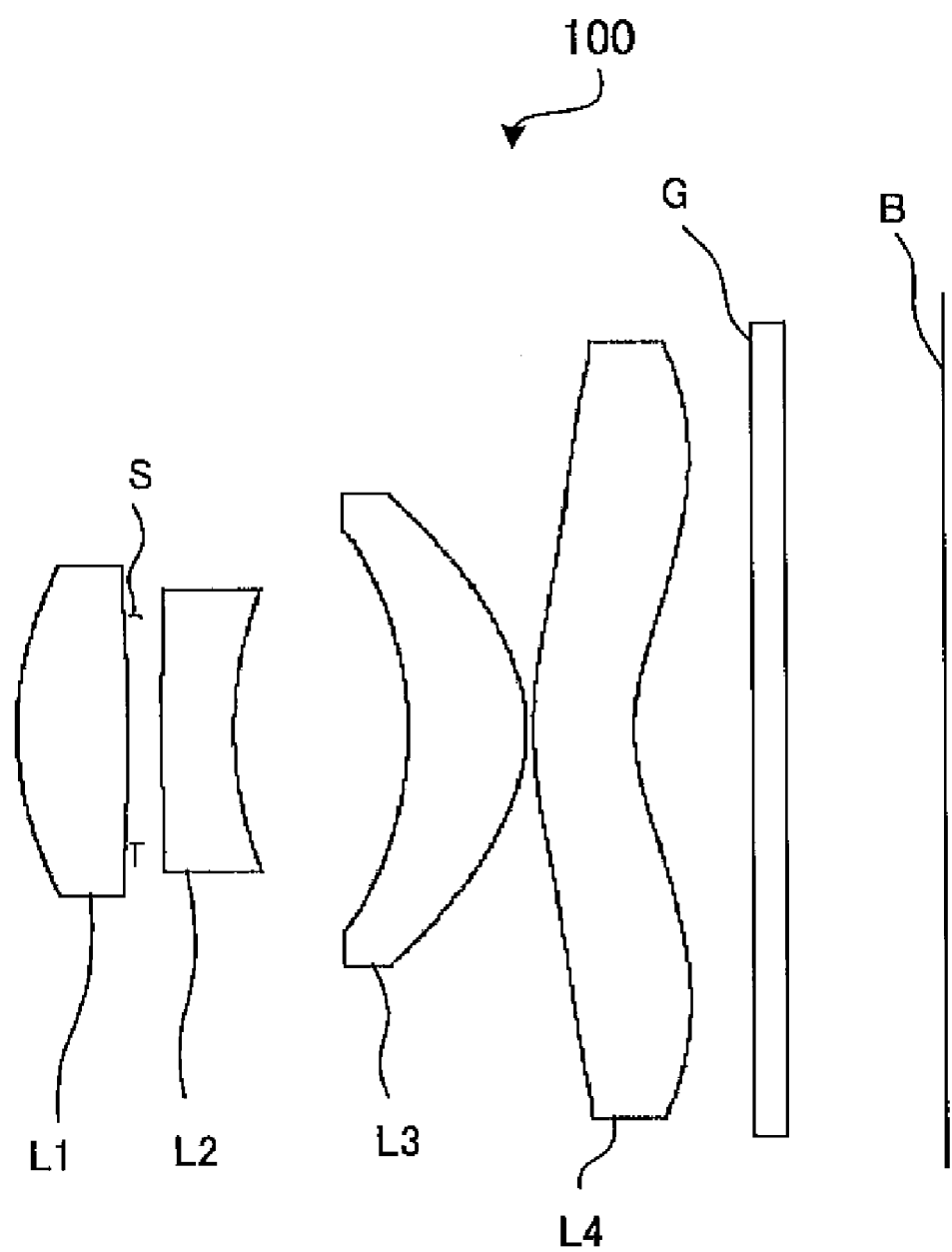
FIG. 4 is a lens configuration diagram of an imaging lens according to Example 4.

As shown in FIG. 4, the imaging lens according to Example 4 of the present invention has a lens configuration as shown below.

Table 4(a) shows configuration data of the imaging lens according to Example 4.

Table 4(b) shows aspheric coefficients of the imaging lens according to Example 4.

TABLE 3 (a)

lens configuration data

| No. | r | d | nd | νd | |
|---|---|---|---|---|---|
| 1 | 2.331 | 0.539 | 1.54341 | 56 | first lens |
| 2 | −6.900 | 0.040 | | | |
| s3 | 0.000 | 0.116 | | | aperture stop |
| 4 | 4.032 | 0.304 | 1.60717 | 27 | second lens |
| 5 | 1.679 | 1.341 | | | |
| 6 | −2.097 | 0.586 | 1.54341 | 56 | third lens |
| 7 | −1.170 | 0.064 | | | |
| 8 | 2.652 | 0.638 | 1.53116 | 56 | fourth lens |
| 9 | 1.278 | 0.790 | | | |
| 10 | 0.000 | 0.210 | 1.5168 | 64.2 | parallel-plate glass |
| 11 | 0.000 | 0.959 | | | |
| 12 | 0.000 | 0.000 | | | |

TABLE 4 (a)

lens configuration data

| No. | r | d | nd | νd | |
|---|---|---|---|---|---|
| 1 | 2.257 | 0.729 | 1.54341 | 56 | first lens |
| 2 | −10.648 | 0.047 | | | |
| s3 | 0.000 | 0.176 | | | aperture stop |
| 4 | 23.735 | 0.475 | 1.60695 | 27 | second lens |
| 5 | 2.537 | 1.146 | | | |
| 6 | −2.288 | 0.779 | 1.53115 | 56 | third lens |
| 7 | −1.167 | 0.047 | | | |
| 8 | 2.662 | 0.661 | 1.53115 | 56 | fourth lens |
| 9 | 1.273 | 0.790 | | | |
| 10 | 0.000 | 0.210 | 1.5168 | 64.2 | parallel-plate glass |
| 11 | 0.000 | 1.049 | | | |
| 12 | 0.000 | 0.000 | | | |

TABLE 3 (b)

cone constant and aspheric coefficients

| No. | k | α4 | α6 | α8 | α10 | α12 | α14 | α16 |
|---|---|---|---|---|---|---|---|---|
| 1 | −1.385233345 | −0.004240062 | 0.038522004 | −0.086190577 | 0.073643433 | −0.027612631 | 0 | 0 |
| 2 | −201.1952247 | 0.018395922 | −0.018701427 | −0.045021267 | 0.070695951 | −0.036725714 | 0 | 0 |
| 4 | 0 | 0.087081511 | −0.131628534 | 0.075474229 | −0.009661799 | 0.003619456 | 0 | 0 |
| 5 | 0.488048447 | −0.016358453 | −0.028665144 | −0.043551073 | 0.071767237 | −0.027811384 | 0 | 0 |
| 6 | 0 | 0.069752525 | −0.011883521 | −0.002428316 | 0.004273182 | −0.001174111 | 0 | 0 |
| 7 | −3.315545026 | −0.026222775 | 0.014675214 | 4.13313E−05 | 1.1024E−05 | −0.000152457 | 0 | 0 |
| 8 | −8.759926964 | −0.020648507 | 0.006411607 | −0.000923002 | 7.16496E−05 | −2.33029E−06 | 0 | 0 |
| 9 | −6.801770349 | −0.02641521 | 0.004983261 | −0.000728121 | 5.7247E−05 | −1.75817E−06 | 0 | 0 |

TABLE 4 (b)

cone constant and aspheric coefficients

| No. | k | α4 | α6 | α8 | α10 | α12 | α14 | α16 |
|---|---|---|---|---|---|---|---|---|
| 1 | −0.465640449 | 0.003280133 | 0.014616781 | −0.035088323 | 0.031954259 | −0.014735694 | 0 | 0 |
| 2 | −224.1245866 | 0.010781255 | −0.02086612 | −0.026130057 | 0.032764052 | −0.019545363 | 0 | 0 |
| 4 | 0 | 0.03334496 | −0.076658216 | 0.042458795 | −0.064451874 | 0.048411262 | 0 | 0 |
| 5 | 2.214165442 | 0.007915185 | −0.043350802 | 0.006101412 | −0.001443057 | 0.003182387 | 0 | 0 |
| 6 | 0 | 0.018567765 | −0.010208388 | −0.002839494 | 0.004545002 | −0.001407681 | 0 | 0 |
| 7 | −3.143462916 | −0.06967724 | 0.014737971 | −0.002357401 | −0.000104074 | 0.000261062 | 0 | 0 |
| 8 | −9.155145029 | −0.027816486 | 0.006737006 | −0.000733187 | 4.03961E−05 | −8.8298E−07 | 0 | 0 |
| 9 | −6.088583835 | −0.029904352 | 0.004485423 | −0.000668306 | 5.93436E−05 | −2.13435E−06 | 0 | 0 |

The focal length f of the entire lens system of the imaging lens according to the present example is 4.857 mm. The F-number of the entire lens system is F2.8. The field angle 2ω of the entire lens system is 60.4°.

An aperture stop S is arranged between the lens L1 and the lens L2.

Each of the lenses L1 to L4 constitutes two lens surfaces, the aperture stop S constitutes one surface, and the parallel-plate glass G constitutes two surfaces. Each lens surface has curvature radius r, distance d, refractive index nd to a d-line, and Abbe number vd shown in Table 4(a). In Table 4(a), "No." indicates lens surface number, which is assigned in an order that starts from the object side. The lens surface number s3 indicates the aperture stop S. The distance d indicates the distance from each of the lens surface to the next lens surface.

TABLE 5 (a)

lens configuration data

| No. | r | d | nd | vd | |
|---|---|---|---|---|---|
| s1 | 0.000 | −0.120 | | | aperture stop |
| 2 | 2.331 | 0.744 | 1.53367 | 56 | first lens |
| 3 | −7.730 | 0.082 | | | |
| 4 | 4.908 | 0.330 | 1.6133 | 27 | second lens |
| 5 | 1.976 | 1.102 | | | |
| 6 | −3.679 | 0.834 | 1.53367 | 56 | third lens |
| 7 | −1.029 | 0.168 | | | |
| 8 | 3.323 | 0.400 | 1.53367 | 56 | fourth lens |
| 9 | 0.917 | 0.600 | | | |
| 10 | 0.000 | 0.210 | 1.51893 | 64.2 | |
| 11 | 0.000 | 1.105 | | | parallel-plate glass |
| 12 | 0.000 | 0.000 | | | |

TABLE 5 (b)

cone constant and aspheric coefficients

| No. | k | α4 | α6 | α8 | α10 | α12 | α14 | α16 |
|---|---|---|---|---|---|---|---|---|
| 2 | −0.627124719 | −0.006076292 | −0.01554251 | 0.007307007 | −0.008353481 | −0.000690151 | 0 | 0 |
| 3 | 47.12870907 | −0.007494097 | −0.011294447 | 0.011847031 | 0.010751986 | −0.005072631 | 0 | 0 |
| 4 | 8.862108872 | −0.052663425 | −0.020553872 | 0.062249167 | −0.019046364 | 0.001453947 | 0.000357235 | −0.002799742 |
| 5 | 1.226249583 | −0.055331583 | −0.021687259 | 0.037349708 | −0.012057183 | −0.000557588 | −0.000142943 | −0.001133818 |
| 6 | 3.788786669 | 0.051818418 | −0.035361233 | 0.022329655 | −0.005782364 | 0.000988604 | −3.7167E−05 | −5.09315E−06 |
| 7 | −4.731980572 | −0.048440986 | 0.019396112 | −0.007028273 | 0.004592618 | −0.000833259 | 7.87387E−06 | −9.9263E−07 |
| 8 | −4.229112555 | −0.090663633 | 0.018260324 | 5.35534E−05 | −0.000386817 | 2.1789E−05 | 4.9452E−07 | 1.1086E−07 |
| 9 | −5.227907412 | −0.05997732 | 0.015210502 | −0.003241923 | 0.000449573 | −3.16807E−05 | −3.99E−08 | 4.485E−08 |

The cone constant k and aspheric coefficients $\alpha_4$, $\alpha_6$, $\alpha_8$, $\alpha_{10}$, $\alpha_{12}$, $\alpha_{14}$, and $\alpha_{16}$ of each lens surface according to Example 4 are as shown in Table 4(b). In Table 4(b), "No." indicates the same lens surface numbers as those that are indicated in Table 4(a).

EXAMPLE 5

Figure 5:
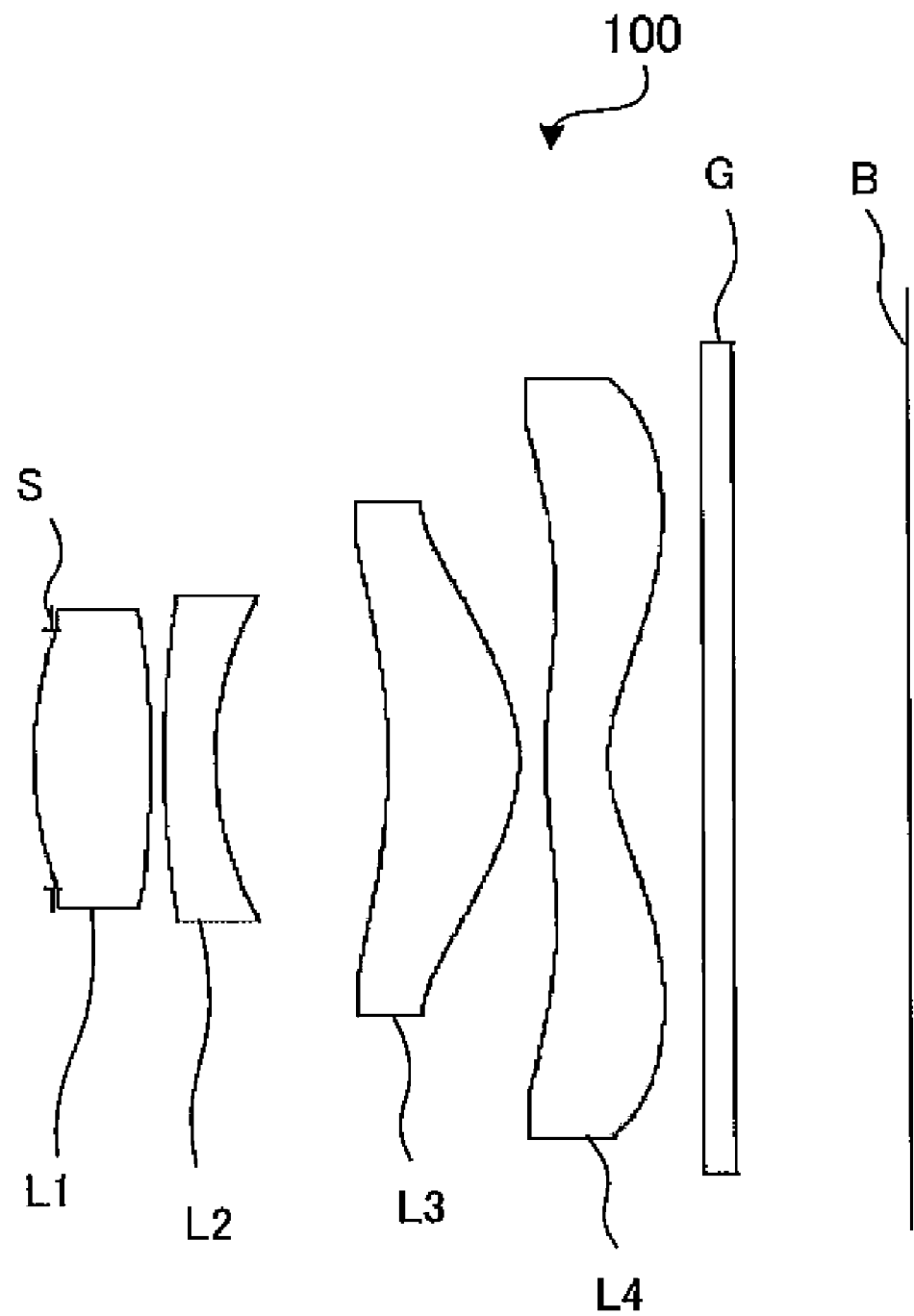
FIG. 5 is a lens configuration diagram of an imaging lens according to Example 5.

FIG. 5 is a lens configuration diagram showing the imaging lens according to Example 5.

As shown in FIG. 5, the imaging lens according to Example 5 of the present invention has a lens configuration as shown below.

Table 5(a) shows configuration data of the imaging lens according to Example 5.

Table 5(b) shows aspheric coefficients of the imaging lens according to Example 5.

The focal length f of the entire lens system of the imaging lens according to the present example is 4.639 mm. The F-number of the entire lens system is F2.8. The field angle 2ω of the entire lens system lens is 65.5°.

An aperture stop S is arranged at the object side of the lens L1.

Each of the lenses L1 to L4 constitutes two lens surfaces, the aperture stop S constitutes one surface, and the parallel-plate glass G constitutes two surfaces. Each lens surface has curvature radius r, distance d, refractive index nd to a d-line, and Abbe number vd shown in Table 5(a). In Table 5(a), "No." indicates lens surface number, which is assigned in an order that starts from the object side. The lens surface number s1 indicates the aperture stop S. The distance d indicates the distance from each of the lens surface to the next lens surface.

The cone constant k and aspheric coefficients $\alpha_4$, $\alpha_6$, $\alpha_8$, $\alpha_{10}$, $\alpha_{12}$, $\alpha_{14}$, and $\alpha_{16}$ of each lens surface according to Example 5 are as shown in Table 5(b). In Table 5(b), "No." indicates the same lens surface numbers as those that are indicated in Table 5(a).

EXAMPLE 6

Figure 6:
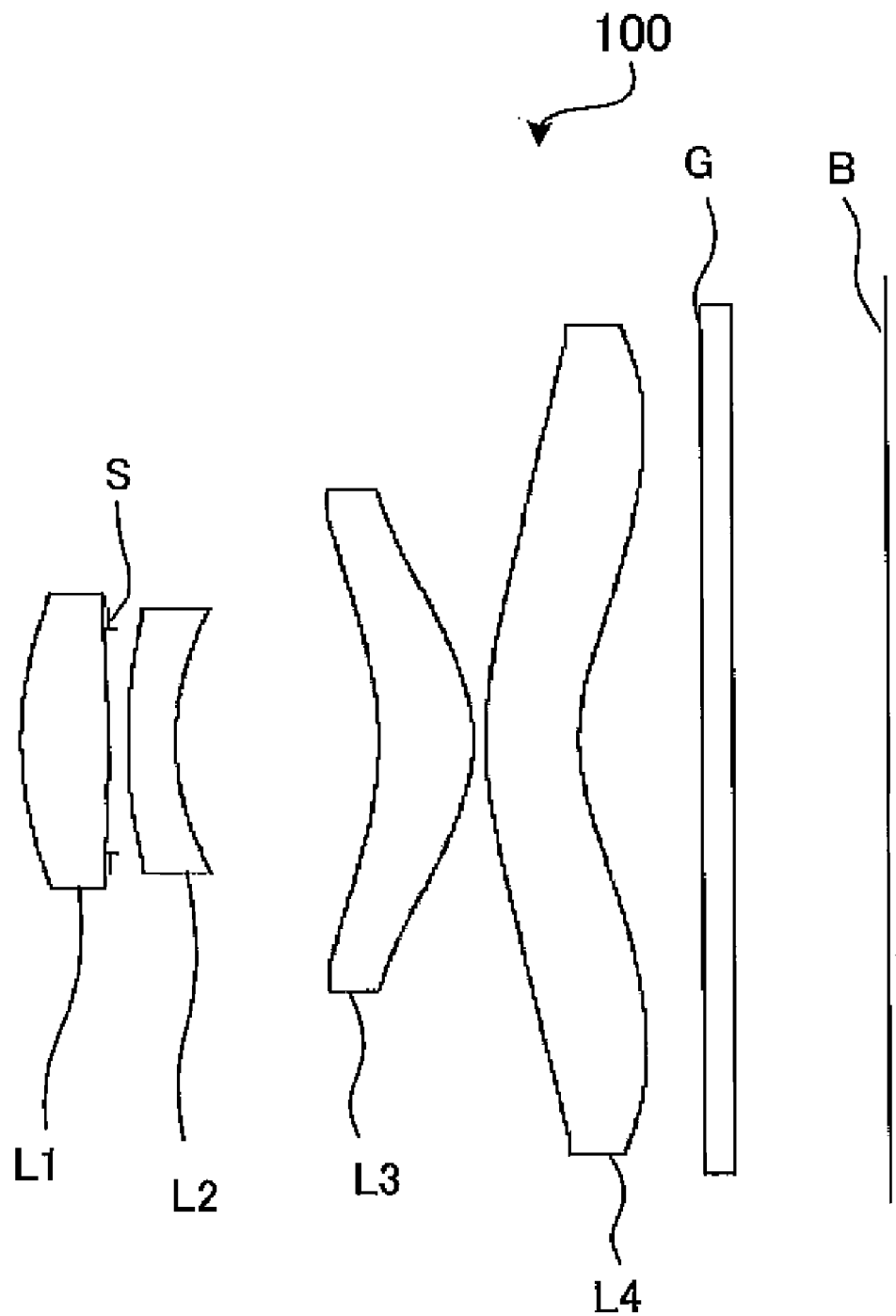
FIG. 6 is a lens configuration diagram of an imaging lens according to Example 6.

As shown in FIG. 6, the imaging lens according to Example 6 of the present invention has a lens configuration as shown below.

Table 6(a) shows configuration data of the imaging lens according to Example 6.

Table 6(b) shows aspheric coefficients of the imaging lens according to Example 6.

TABLE 6 (a)

lens configuration data

| No. | r | d | nd | vd | |
|---|---|---|---|---|---|
| 1 | 2.341 | 0.564 | 1.54341 | 56 | first lens |
| 2 | −6.483 | 0.010 | | | |
| s3 | 0.000 | 0.117 | | | aperture stop |
| 4 | 4.081 | 0.305 | 1.60717 | 27 | second lens |
| 5 | 1.664 | 1.306 | | | |
| 6 | −2.103 | 0.609 | 1.53115 | 56 | third lens |
| 7 | −1.134 | 0.081 | | | |
| 8 | 2.483 | 0.602 | 1.53115 | 56 | fourth lens |
| 9 | 1.202 | 0.790 | | | |
| 10 | 0.000 | 0.210 | 1.5168 | 64.2 | parallel-plate glass |
| 11 | 0.000 | 0.988 | | | |
| 12 | 0.000 | 0.000 | | | | and Abbe number vd shown in Table 6(a). In Table 6(a), "No." indicates lens surface number, which is assigned in an order that starts from the object side. The lens surface number s3 indicates the aperture stop S. The distance d indicates the distance from each of the lens surface to the next lens surface.

The cone constant k and aspheric coefficients $\alpha_4$, $\alpha_6$, $\alpha_8$, $\alpha_{10}$, $\alpha_{12}$, $\alpha_{14}$, and $\alpha_{16}$ of each lens surface according to Example 6 are as shown in Table 6(b). In Table 6(b), "No." indicates the same lens surface numbers as those that are indicated in Table 6(a).

EXAMPLE 7

Figure 7:
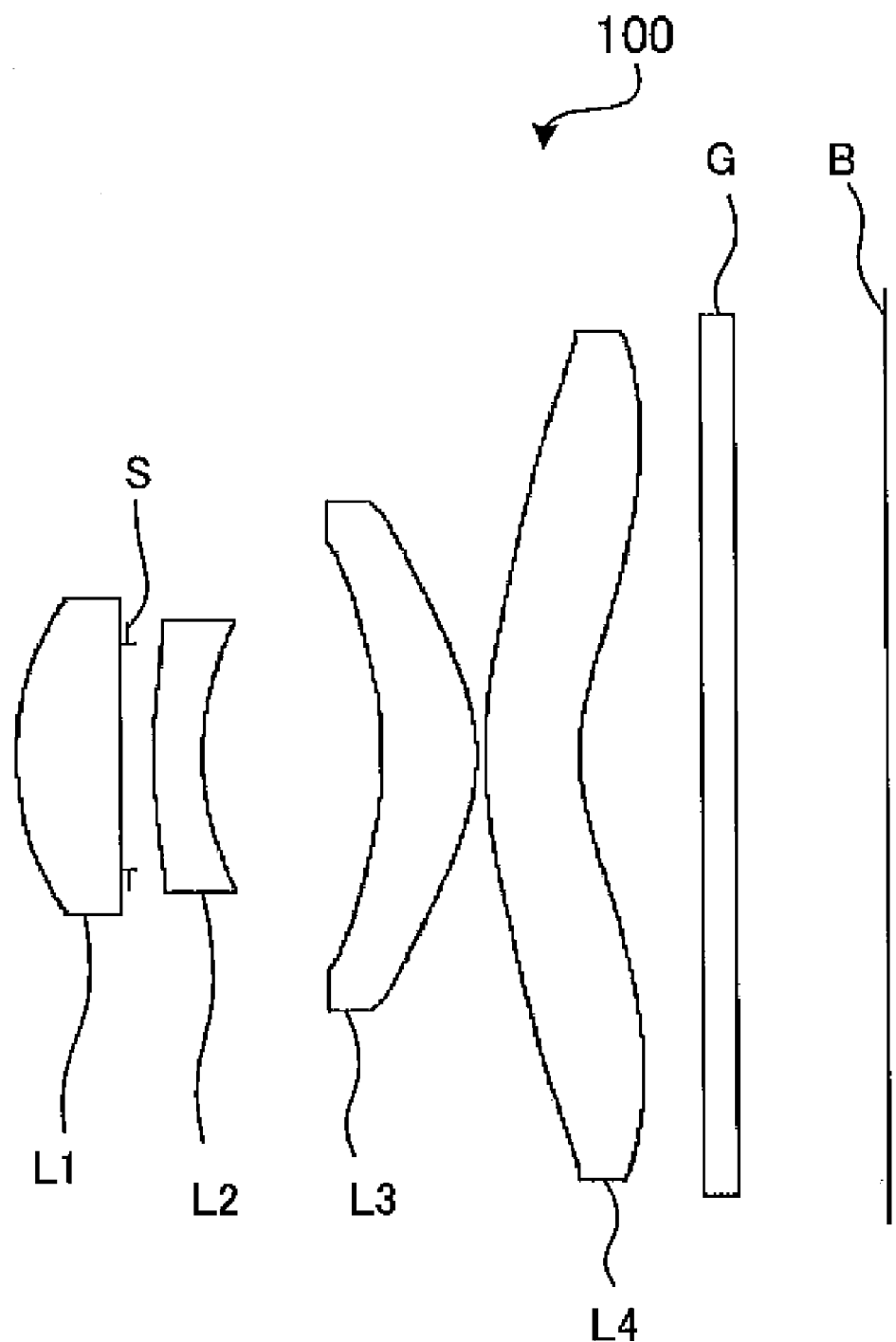
FIG. 7 is a lens configuration diagram of an imaging lens according to Example 7.

As shown in FIG. 7, the imaging lens according to Example 7 of the present invention has a lens configuration as shown below.

Table 7(a) shows configuration data of the imaging lens according to Example 7.

Table 7(b) shows aspheric coefficients of the imaging lens according to Example 7.

TABLE 7 (a)

lens configuration data

| No. | r | d | nd | vd | |
|---|---|---|---|---|---|
| 1 | 1.768 | 0.662 | 1.48749 | 70 | first lens |
| 2 | −2438.119 | 0.053 | | | |
| s3 | 0.000 | 0.163 | | | aperture stop |
| 4 | 3.680 | 0.313 | 1.60717 | 27 | second lens |
| 5 | 1.749 | 1.147 | | | |
| 6 | −2.339 | 0.606 | 1.53115 | 56 | third lens |
| 7 | −1.211 | 0.050 | | | |

TABLE 6 (b)

cone constant and aspheric coefficients

| No. | k | α4 | α6 | α8 | α10 | α12 | α14 | α16 |
|---|---|---|---|---|---|---|---|---|
| 1 | −1.285267403 | −0.003598182 | 0.035542218 | −0.083972065 | 0.079888312 | −0.030031357 | 0 | 0 |
| 2 | −204.6946976 | 0.018115476 | −0.016288701 | −0.040203041 | 0.074353192 | −0.036627635 | 0 | 0 |
| 4 | 1.519050936 | 0.085939719 | −0.135242578 | 0.075663717 | −0.002843444 | 0.014739916 | 0 | 0 |
| 5 | 0.422513884 | −0.02266237 | −0.027859925 | −0.038264612 | 0.078356846 | −0.030864354 | 0 | 0 |
| 6 | −0.118732769 | 0.072562734 | −0.010436009 | −0.002344544 | 0.004113301 | −0.001169939 | 0 | 0 |
| 7 | −3.395039207 | −0.026008359 | 0.015875251 | 0.000367182 | 3.82691E−05 | −0.000196801 | 0 | 0 |
| 8 | −6.97064569 | −0.022135193 | 0.006361181 | −0.000923629 | 7.08722E−05 | −2.29634E−06 | 0 | 0 |
| 9 | −6.343999502 | −0.025475187 | 0.004765438 | −0.000733339 | 5.56509E−05 | −1.72049E−06 | 0 | 0 |

The focal length f of the entire lens system of the imaging lens according to the present example is 4.596 mm. The F-number of the entire lens system is F2.88. The field angle 2ω of the entire lens system is 65.9°.

An aperture stop S is arranged between the lens L1 and the lens L2.

Each of the lenses L1 to L4 constitutes two lens surfaces, the aperture stop S constitutes one surface, and the parallel-plate glass G constitutes two surfaces. Each lens surface has curvature radius r, distance d, refractive index nd to a d-line, TABLE 7 (a)-continued lens configuration data

| No. | r | d | nd | vd | |
|---|---|---|---|---|---|
| 8 | 2.785 | 0.603 | 1.53115 | 56 | fourth lens |
| 9 | 1.264 | 0.790 | | | |
| 10 | 0.000 | 0.210 | 1.5168 | 64.2 | parallel-plate glass |
| 11 | 0.000 | 0.958 | | | |
| 12 | 0.000 | 0.000 | | | |

TABLE 7 (b)

cone constant and aspheric coefficients

| No. | k | α4 | α6 | α8 | α10 | α12 | α14 | α16 |
|---|---|---|---|---|---|---|---|---|
| 4 | −47.24628617 | 0.0499583 | −0.114751683 | 0.105304464 | −0.013854063 | −0.029792934 | 0 | 0 |
| 5 | 0.123611472 | −0.05173951 | 0.019833833 | −0.013796433 | 0.036086983 | −0.021697938 | 0 | 0 |
| 6 | 0.255240853 | 0.061986018 | −0.012316068 | −0.002643534 | 0.004038506 | −0.001810735 | 0 | 0 |
| 7 | −3.940786279 | −0.018402265 | 0.014112597 | −0.000974968 | −0.00041241 | −0.000203532 | 0 | 0 |

TABLE 7 (b)-continued cone constant and aspheric coefficients

| No. | k | α4 | α6 | α8 | α10 | α12 | α14 | α16 |
|---|---|---|---|---|---|---|---|---|
| 8 | −8.464195916 | −0.019687696 | 0.006666672 | −0.000966554 | 6.9066E−05 | −2.02862E−06 | 0 | 0 |
| 9 | −7.052764769 | −0.025677608 | 0.004794884 | −0.000704687 | 5.95963E−05 | −2.29433E−06 | 0 | 0 |

The focal length f of the entire lens system of the imaging lens according to the present example is 4.835 mm. The F-number of the entire lens system is F2.88. The field angle 2ω of the entire lens system is 64.0°.

An aperture stop S is arranged between the lens L1 and the lens L2.

Each of the lenses L1 to L4 constitutes two lens surfaces, the aperture stop S constitutes one surface, and the parallel-plate glass G constitutes two surfaces. Each lens surface has curvature radius r, distance d, refractive index nd to a d-line, and Abbe number vd shown in Table 7(a). In Table 7(a), "No."

TABLE 8 (a)-continued lens configuration data

| No. | r | d | nd | vd | |
|---|---|---|---|---|---|
| 5 | 2.537 | 1.093 | | | |
| 6 | −2.288 | 0.708 | 1.53115 | 56 | third lens |
| 7 | −1.167 | 0.108 | | | |
| 8 | 2.662 | 0.607 | 1.53115 | 56 | fourth lens |
| 9 | 1.273 | 0.790 | | | |
| 10 | 0.000 | 0.210 | 1.5168 | 64.2 | parallel-plate glass |
| 11 | 0.000 | 0.918 | | | |
| 12 | 0.000 | 0.000 | | | |

TABLE 8 (b)

cone constant and aspheric coefficients

| No. | k | α4 | α6 | α8 | α10 | α12 | α14 | α16 |
|---|---|---|---|---|---|---|---|---|
| 1 | −0.67051032 | 0.000844046 | 0.016682329 | −0.0342682 | 0.031792331 | −0.012445634 | 0 | 0 |
| 2 | −320.4749032 | 0.01480619 | −0.01233044 | −0.014846452 | 0.039034216 | −0.028255828 | 0 | 0 |
| 4 | 0 | 0.045817839 | −0.063477812 | 0.046873667 | −0.063235972 | 0.062940543 | 0 | 0 |
| 5 | 2.063012393 | 0.003331033 | −0.040833611 | 0.006833103 | −0.001831965 | 0.007568325 | 0 | 0 |
| 6 | 0 | 0.01213163 | −0.006923801 | −0.002746301 | 0.003962516 | −0.001949478 | 0 | 0 |
| 7 | −3.200123323 | −0.069420528 | 0.017350022 | −0.001153094 | 1.08551E−06 | 0.0002511 | 0 | 0 |
| 8 | −9.155145029 | −0.027816486 | 0.006737006 | −0.000733187 | 4.03961E−05 | −8.8298E−07 | 0 | 0 |
| 9 | −6.088583835 | −0.029904352 | 0.004485423 | −0.000668306 | 5.93436E−05 | −2.13435E−06 | 0 | 0 | indicates lens surface number, which is assigned in an order that starts from the object side. The lens surface number s3 indicates the aperture stop S. The distance d indicates the distance from each of the lens surface to the next lens surface.

The cone constant k and aspheric coefficients $\alpha_4$, $\alpha_6$, $\alpha_8$, $\alpha_{10}$, $\alpha_{12}$, $\alpha_{14}$, and $\alpha_{16}$ of each lens surface according to Example 7 are as shown in Table 7(b). In Table 7(b), "No." indicates the same lens surface numbers as those that are indicated in Table 7(a).

EXAMPLE 8

Figure 8:
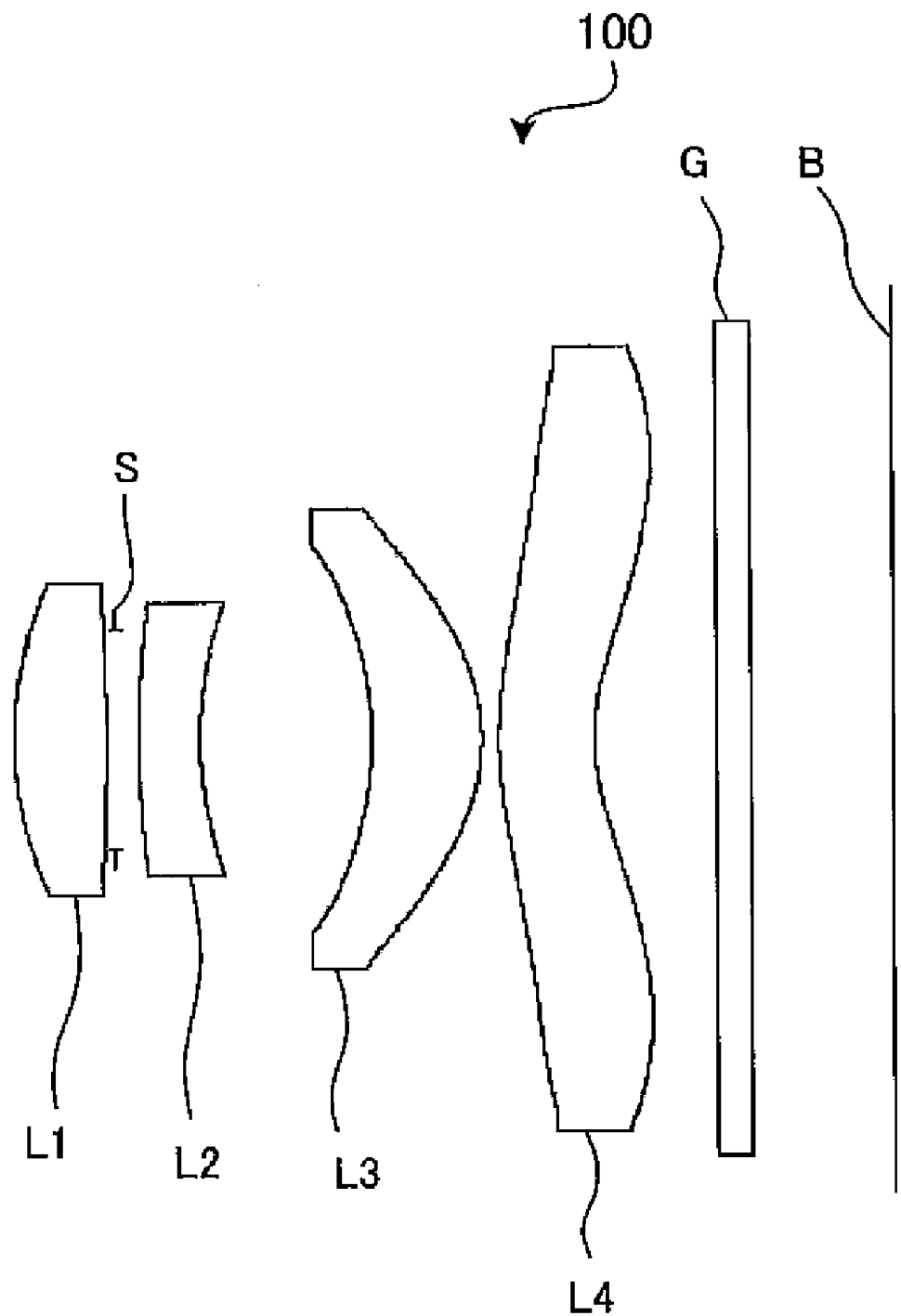
FIG. 8 is a lens configuration diagram of an imaging lens according to Example 8.

As shown in FIG. 8, the imaging lens according to Example 8 of the present invention has a lens configuration as shown below.

Table 8 (a) shows configuration data of the imaging lens according to Example 8.

Table 8(b) shows aspheric coefficients of the imaging lens according to Example 8.

TABLE 8 (a)

lens configuration data

| No. | r | d | nd | vd | |
|---|---|---|---|---|---|
| 1 | 2.394 | 0.589 | 1.5434 | 56 | first lens |
| 2 | −10.788 | 0.056 | | | |
| s3 | 0.000 | 0.153 | | | aperture stop |
| 4 | 8.214 | 0.387 | 1.60695 | 27 | second lens |

The focal length f of the entire lens system of the imaging lens according to the present example is 4.426 mm. The F-number of the entire lens system is F2.8. The field angle 2ω of the entire lens system is 64.7°.

An aperture stop S is arranged between the lens L1 and the lens L2.

Each of the lenses L1 to L4 constitutes two lens surfaces, the aperture stop S constitutes one surface, and the parallel-plate glass G constitutes two surfaces. Each lens surface has curvature radius r, distance d, refractive index nd to a d-line, and Abbe number vd shown in Table 8(a). In Table 8(a), "No." indicates lens surface number, which is assigned in an order that starts from the object side. The lens surface number s3 indicates the aperture stop S. The distance d indicates the distance from each of the lens surface to the next lens surface.

The cone constant k and aspheric coefficients $\alpha_4$, $\alpha_6$, $\alpha_8$, $\alpha_{10}$, $\alpha_{12}$, $\alpha_{14}$, and $\alpha_{16}$ of each lens surface according to Example 8 are as shown in Table 8(b). In Table 8(b), "No." indicates the same lens surface numbers as those that are indicated in Table 8(a).

EXAMPLE 9

Figure 9:
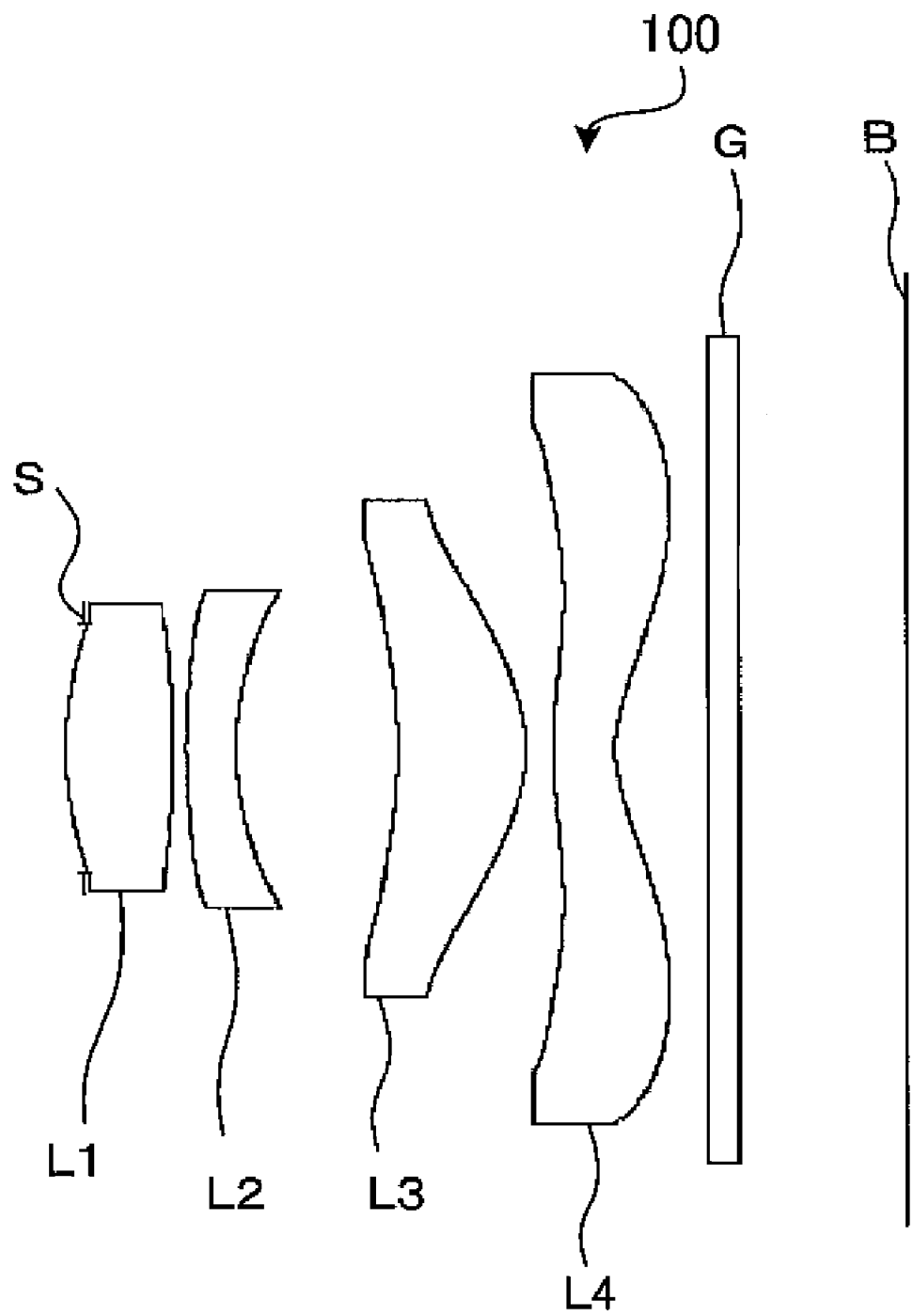
FIG. 9 is a lens configuration diagram of an imaging lens according to Example 9.

As shown in FIG. 9, the imaging lens according to Example 9 of the present invention has a lens configuration as shown below.

Table 9(a) shows configuration data of the imaging lens according to Example 9.

Table 9(b) shows aspheric coefficients of the imaging lens according to Example 9.

TABLE 9 (a)

lens configuration data

| No. | r | d | nd | vd | |
|---|---|---|---|---|---|
| s1 | 0.000 | −0.120 | | | aperture stop |
| 2 | 2.303 | 0.700 | 1.52528 | 56 | first lens |
| 3 | −7.925 | 0.090 | | | |
| 4 | 4.598 | 0.330 | 1.60726 | 26.6 | second lens |
| 5 | 1.943 | 1.050 | | | |
| 6 | −3.650 | 0.840 | 1.52528 | 56 | third lens |
| 7 | −1.025 | 0.180 | | | |
| 8 | 3.356 | 0.400 | 1.52528 | 56 | fourth lens |
| 9 | 0.917 | 0.600 | | | |
| 10 | 0.000 | 0.210 | 1.5168 | 64.2 | parallel-plate glass |
| 11 | 0.000 | 1.087 | | | |
| 12 | 0.000 | 0.000 | | | |

TABLE 9 (b)

cone constant and aspheric coefficients

| No. | k | α4 | α6 | α8 | α10 | α12 | α14 | α16 |
|---|---|---|---|---|---|---|---|---|
| 2 | −0.62374537 | −0.006007054 | −0.016726384 | 0.008014098 | −0.006528931 | 0 | 0 | 0 |
| 3 | 41.74271755 | −0.002745908 | −0.007680746 | 0.010520894 | 0.009231892 | 0 | 0 | 0 |
| 4 | 10.47258139 | −0.049525732 | −0.016899923 | 0.065171735 | −0.018584557 | 0 | 0 | 0 |
| 5 | 1.214057857 | −0.056507874 | −0.021544869 | 0.038361434 | −0.010975109 | 0 | 0 | 0 |
| 6 | 3.957838718 | 0.053355311 | −0.036486195 | 0.021769825 | −0.005899297 | 0.00101841 | 0 | 0 |
| 7 | −4.586381415 | −0.049423799 | 0.019728986 | −0.00696943 | 0.00455285 | −0.00086088 | 0 | 0 |
| 8 | −4.965802396 | −0.090620424 | 0.018419784 | 0.000107815 | −0.000378612 | 2.1091E−05 | 0 | 0 |
| 9 | −5.198936819 | −0.059921953 | 0.015211242 | −0.003250872 | 0.00045395 | −3.045734E−05 | 0 | 0 |

The focal length f of the entire lens system of the imaging lens according to the present example is 4.584 mm. The F-number of the entire lens system is F2.8. The field angle 2ω of the entire lens system is 67.9°.

An aperture stop S is arranged at the object side of the lens L1.

Each of the lenses L1 to L4 constitutes two lens surfaces, the aperture stop S constitutes one surface, and the parallel-plate glass G constitutes two surfaces. Each lens surface has curvature radius r, distance d, refractive index nd to a d-line, and Abbe number vd shown in Table 9(a). In Table 9(a), "No." indicates lens surface number, which is assigned in an order that starts from the object side. The lens surface number s1 indicates the aperture stop S. The distance d indicates the distance from each of the lens surface to the next lens surface.

The cone constant k and aspheric coefficients $\alpha_4$, $\alpha_6$, $\alpha_8$, $\alpha_{10}$, $\alpha_{12}$, $\alpha_{14}$, and $\alpha_{16}$ of each lens surface according to Example 9 are as shown in Table 9(b). In Table 9(b), "No." indicates the same lens surface numbers as those that are indicated in Table 9(a).

EXAMPLE 10

Figure 10:
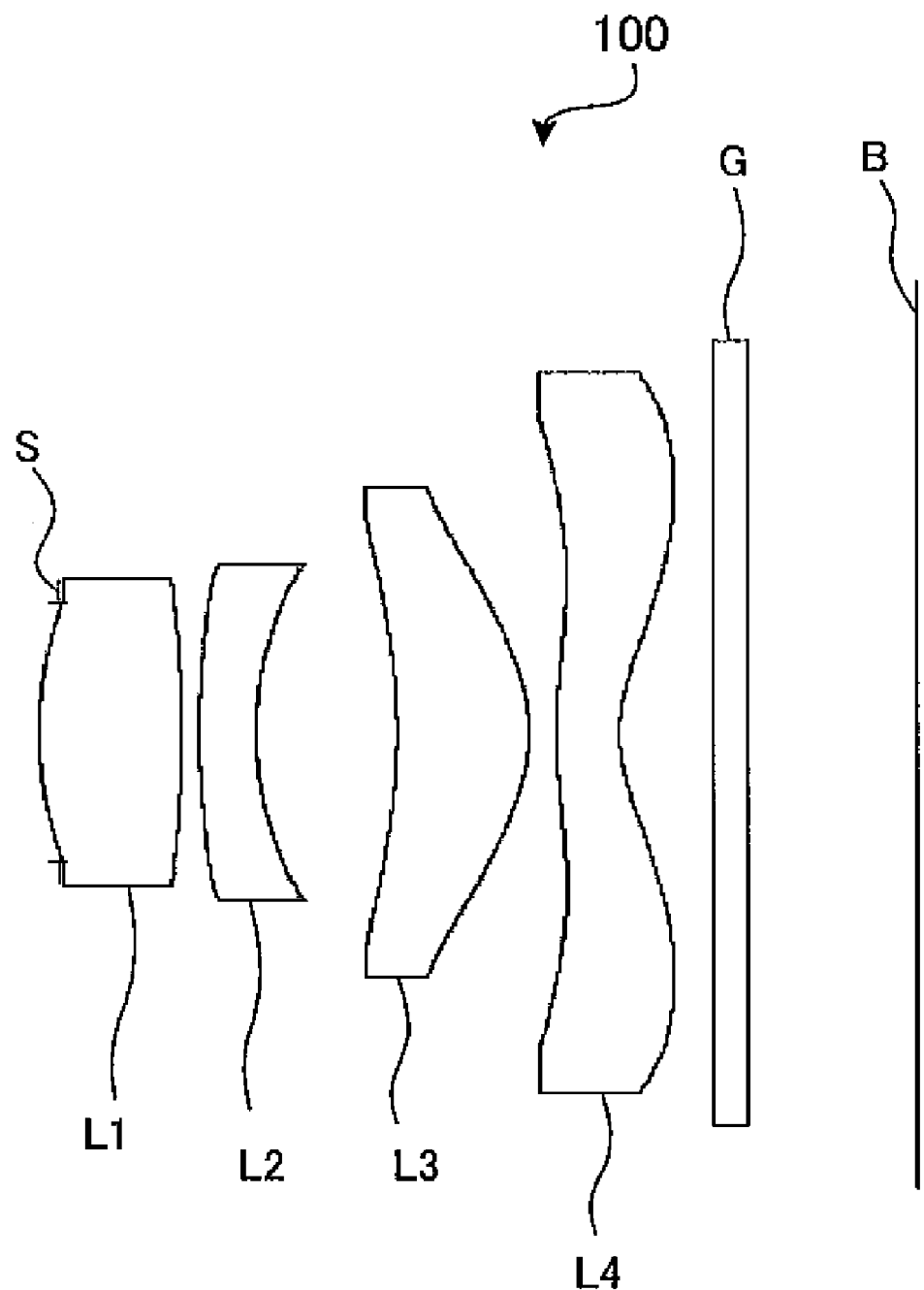
FIG. 10 is a lens configuration diagram of an imaging lens according to Example 10.
Figure 11:
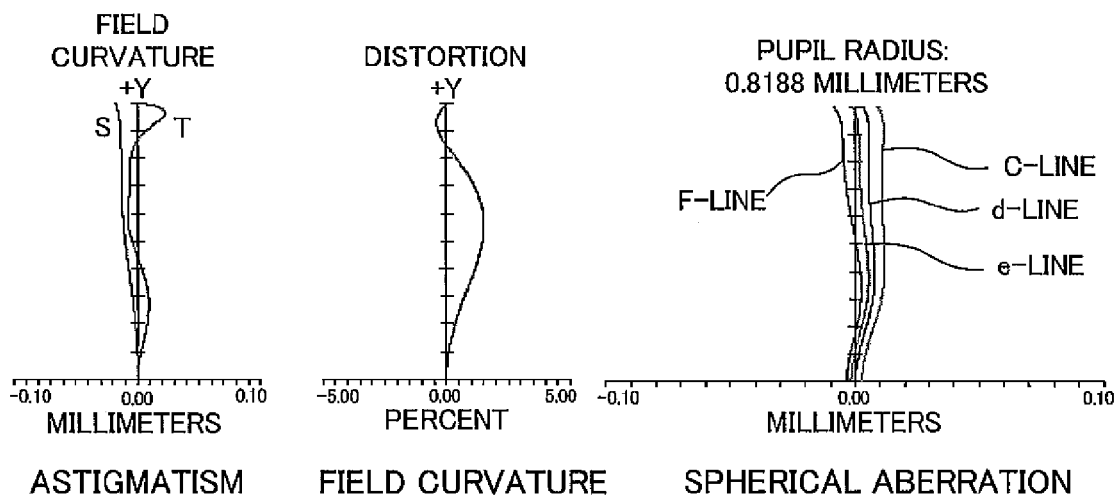
FIG. 11 is an aberration diagram showing astigmatism, distortion, and spherical aberration of the imaging lens according to Example 1.
Figure 12:
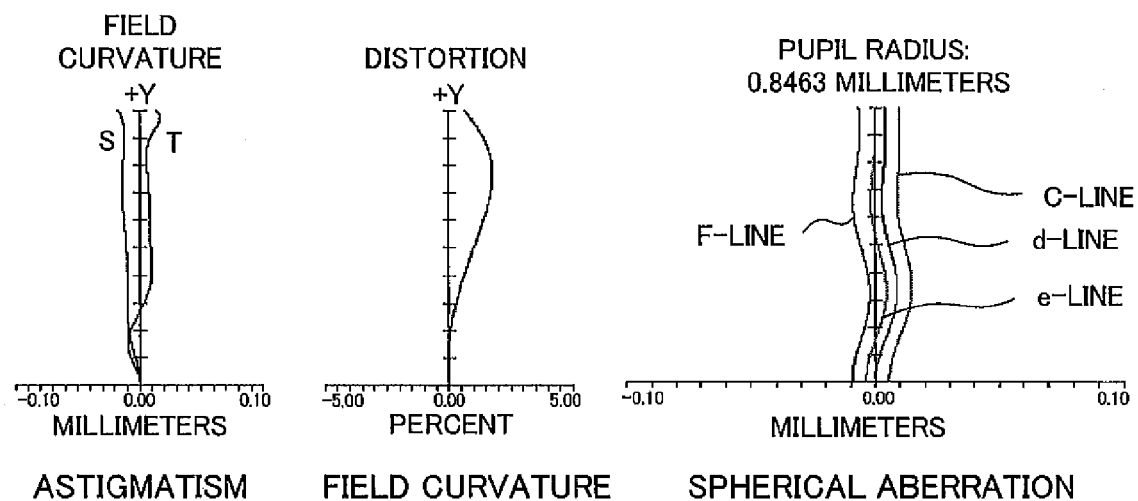
FIG. 12 is an aberration diagram showing astigmatism, field curvature, and spherical aberration of the imaging lens according to Example 2.
Figure 13:
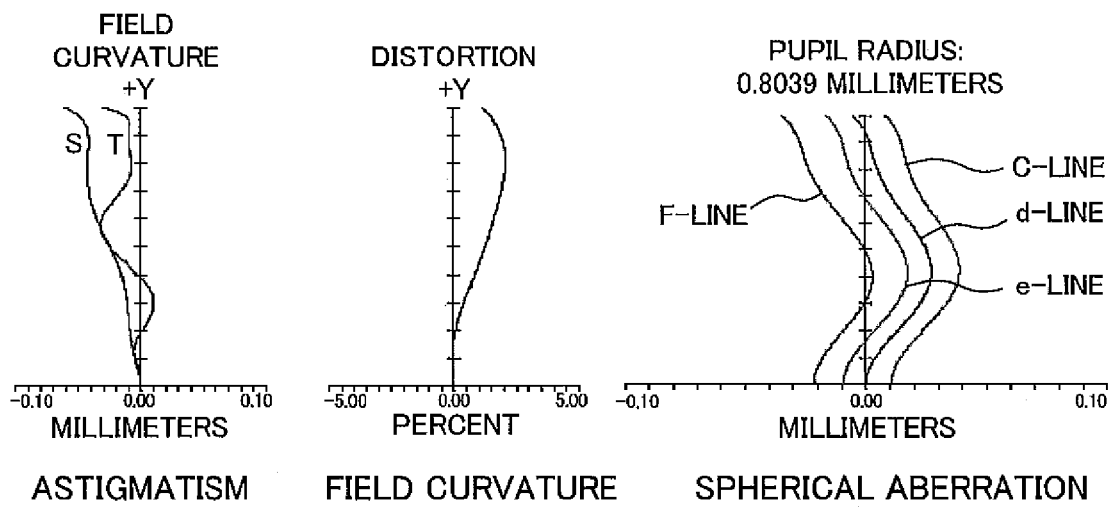
FIG. 13 is an aberration diagram showing astigmatism, field curvature, and spherical aberration of the imaging lens according to Example 3.
Figure 14:
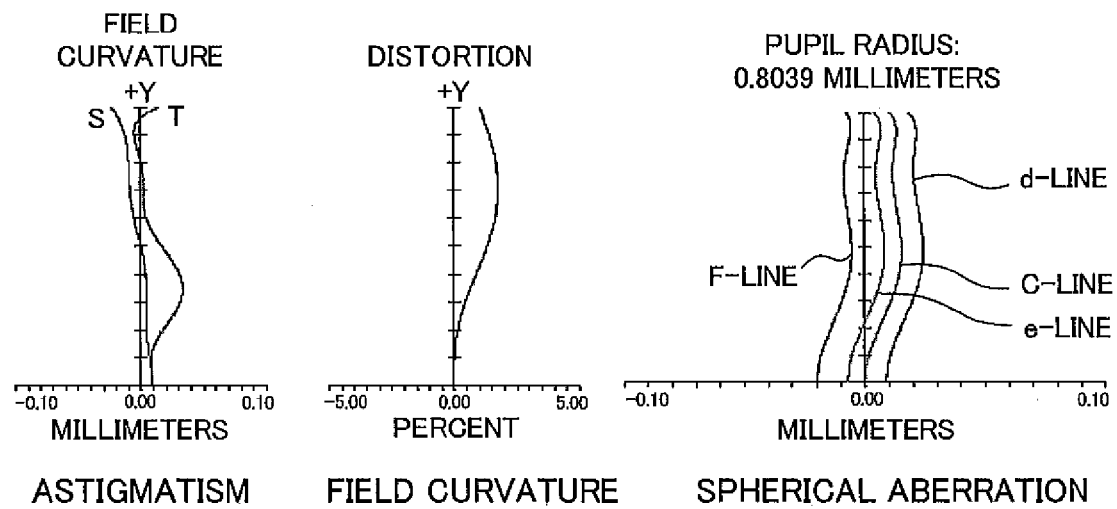
FIG. 14 is an aberration diagram showing astigmatism, field curvature, and spherical aberration of the imaging lens according to Example 4.
Figure 15:
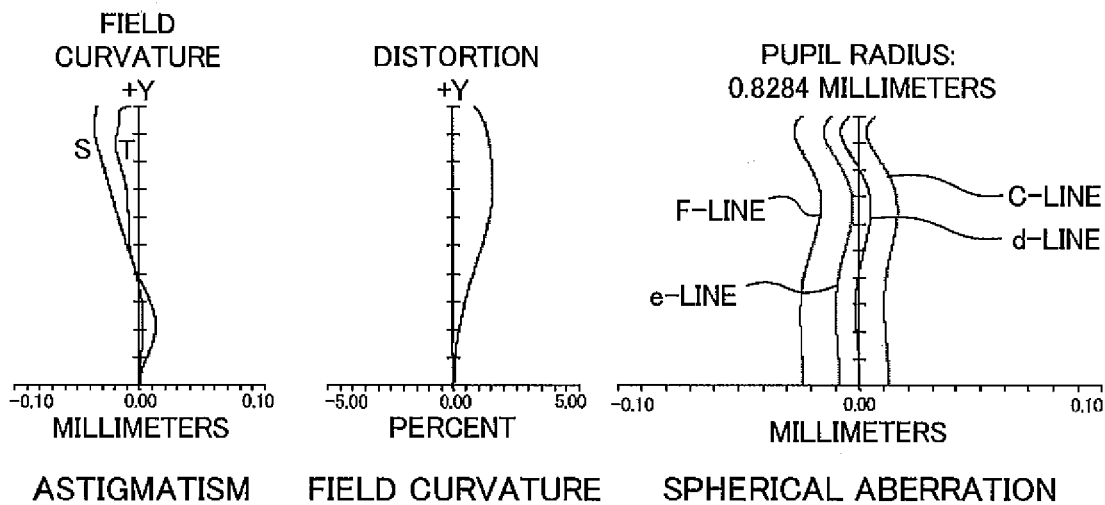
FIG. 15 is an aberration diagram showing astigmatism, field curvature, and spherical aberration of the imaging lens according to Example 5.
Figure 16:
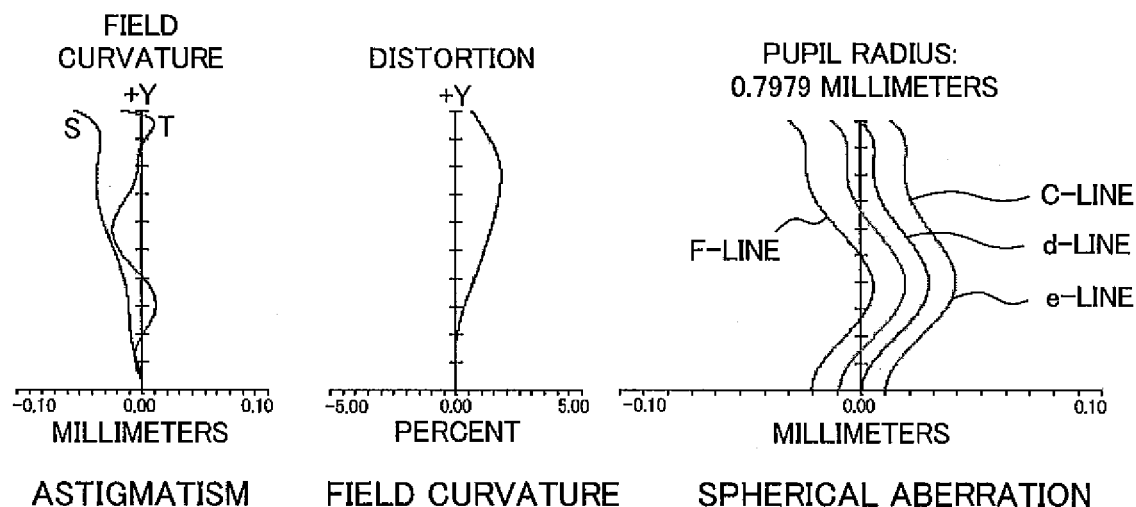
FIG. 16 is an aberration diagram showing astigmatism, field curvature, and spherical aberration of the imaging lens according to Example 6.
Figure 17:
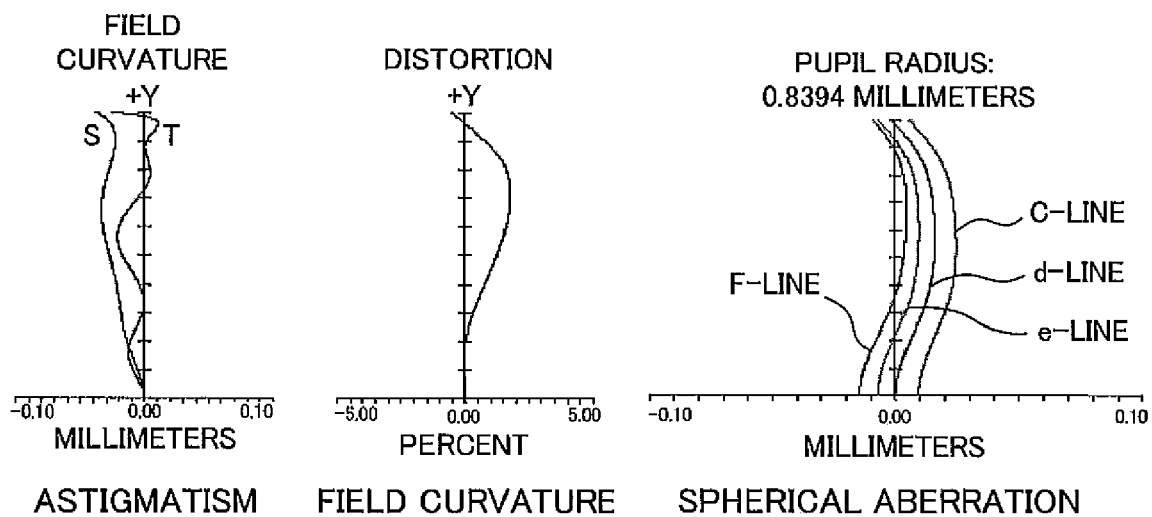
FIG. 17 is an aberration diagram showing astigmatism, field curvature, and spherical aberration of the imaging lens according to Example 7.
Figure 18:
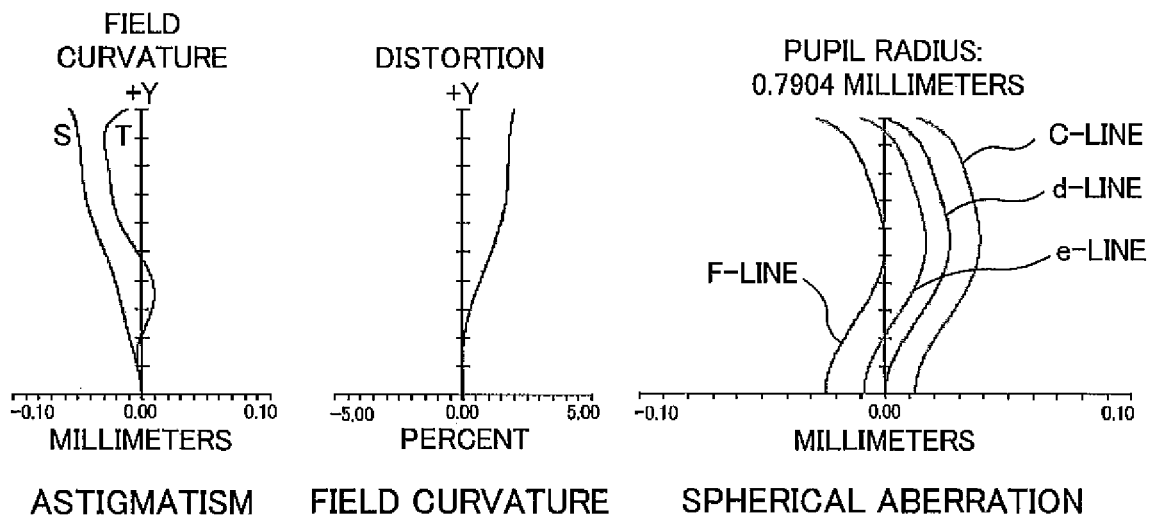
FIG. 18 is an aberration diagram showing astigmatism, field curvature, and spherical aberration of the imaging lens according to Example 8.
Figure 19:
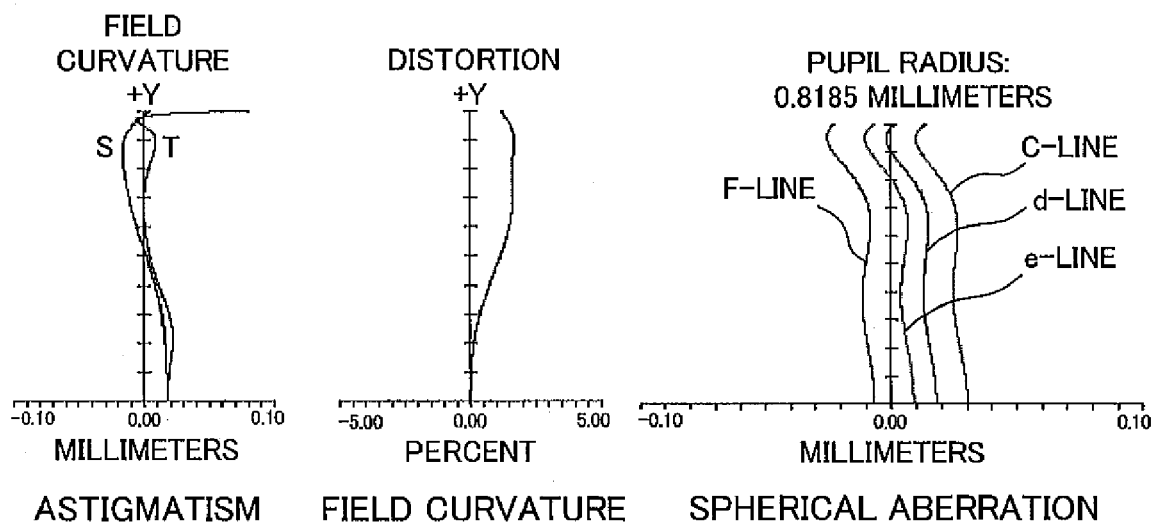
FIG. 19 is an aberration diagram showing astigmatism, field curvature, and spherical aberration of the imaging lens according to Example 9.
Figure 20:
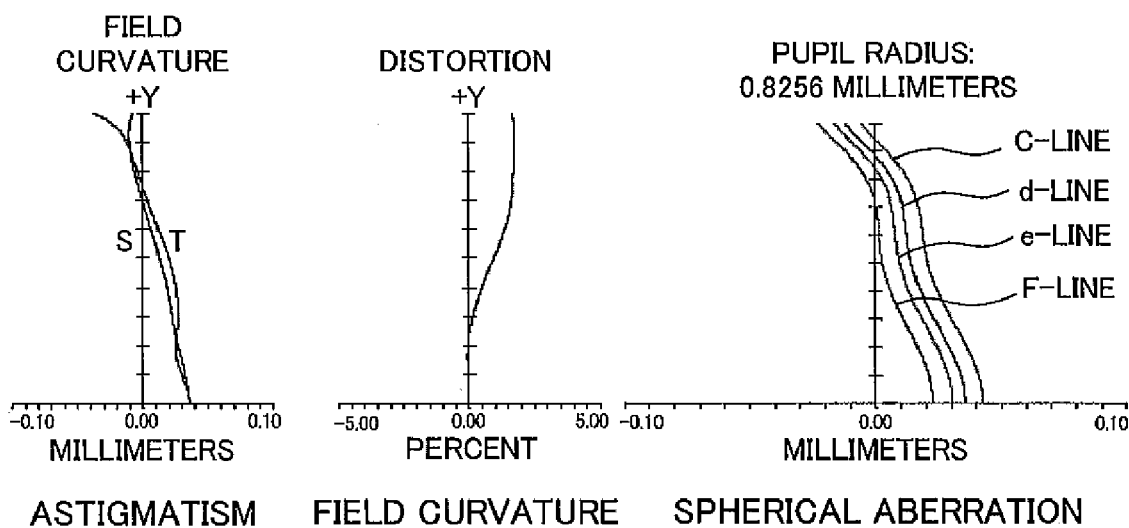
FIG. 20 is an aberration diagram showing astigmatism, field curvature, and spherical aberration of the imaging lens according to Example 10.

As shown in FIG. 10, the imaging lens according to Example 10 of the present invention has a lens configuration as shown below.

Table 10(a) shows configuration data of the imaging lens according to Example 10.

Table 10(b) shows aspheric coefficients of the imaging lens according to Example 10.

TABLE 10 (a)

lens configuration data

| No. | r | d | nd | vd | |
|---|---|---|---|---|---|
| s1 | 0.000 | −0.120 | | | aperture stop |
| 2 | 2.280 | 0.900 | 1.49861 | 81.5 | first lens |
| 3 | −8.033 | 0.110 | | | |
| 4 | 4.579 | 0.360 | 1.5906 | 30 | second lens |
| 5 | 1.958 | 0.890 | | | |
| 6 | −3.703 | 0.840 | 1.52777 | 56 | third lens |
| 7 | −1.022 | 0.170 | | | |
| 8 | 3.282 | 0.400 | 1.52777 | 56 | fourth lens |
| 9 | 0.911 | 0.600 | | | |
| 10 | 0.000 | 0.210 | 1.51893 | 64.2 | parallel-plate glass |
| 11 | 0.000 | 1.077 | | | |
| 12 | 0.000 | 0.000 | | | |

TABLE 10 (b)

cone constant and aspheric coefficients

| No. | k | α4 | α6 | α8 | α10 | α12 | α14 | α16 |
|---|---|---|---|---|---|---|---|---|
| 2 | −0.330926094 | −0.002511142 | −0.014935151 | 0.009953244 | −0.0036095 | 0 | 0 | 0 |
| 3 | 36.35725427 | 0.000185679 | −0.004378826 | 0.011755011 | 0.005977179 | 0 | 0 | 0 |
| 4 | 10.10510219 | −0.050910482 | −0.019933459 | 0.061403348 | −0.019857648 | 0 | 0 | 0 |
| 5 | 1.185133522 | −0.05642135 | −0.021764678 | 0.037214609 | −0.013310344 | 0 | 0 | 0 |
| 6 | 3.658701993 | 0.054178151 | −0.036319035 | 0.021348995 | −0.006135573 | 0.001163373 | 0 | 0 |
| 7 | −4.565030227 | −0.049542658 | 0.019390847 | −0.006930164 | 0.004564656 | −0.00089838 | 0 | 0 |
| 8 | −6.199804335 | −0.090159362 | 0.018340581 | 9.35332E−05 | −0.000381023 | 1.93548E−05 | 0 | 0 |
| 9 | −5.239206897 | −0.06093361 | 0.015282104 | −0.003253621 | 0.00045016 | −3.07043E−05 | 0 | 0 |

The focal length f of the entire lens system of the imaging lens according to the present example is 4.623 mm. The F-number of the entire lens system is F2.8. The field angle 2ω of the entire lens system is 63.1°.

An aperture stop S is arranged at the object side of the lens L1.

Each of the lenses L1 to L4 constitutes two lens surfaces, the aperture stop S constitutes one surface, and the parallel-plate glass G constitutes two surfaces. Each lens surface has curvature radius r, distance d, refractive index nd to a d-line, and Abbe number νd shown in Table 10(a). In Table 10(a), "No." indicates lens surface number, which is assigned in an order that starts from the object side. The lens surface number s1 indicates the aperture stop S. The distance d indicates the distance from each of the lens surface to the next lens surface.

The cone constant k and aspheric coefficients $\alpha_4$, $\alpha_6$, $\alpha_8$, $\alpha_{10}$, $\alpha_{12}$, $\alpha_{14}$, and $\alpha_{16}$ of each lens surface according to Example 10 are as shown in Table 10(b). In Table 10(b), "No." indicates the same lens surface numbers as those that are indicated in Table 10(a).

Table 11 shows the values of the above-described conditional expressions (1) to (5) in Examples 1 to 10 described above.

which makes it difficult to correct aberrations (coma aberration, astigmatism aberration, distortion aberration) at the periphery of the image plane.

The conditional expression (3) sets a condition for effectively correcting a chromatic aberration generated by the first lens L1 by the second lens L2. In a case where the value is not within the range of the conditional expression regardless of whether it is larger or smaller than the range, it becomes difficult to correct a chromatic aberration.

The conditional expression (4) sets a condition for effectively correcting a chromatic aberration generated by the third lens L3 by the fourth lens L4. In a case where the value is not within the range of the conditional expression regardless of whether it is larger or smaller than the range, it becomes difficult to correct a chromatic aberration.

The conditional expression (5) defines the ratio of the air distance between the second lens L2 and the third lens L3 to the allover length. If the air distance between the second lens L2 and the third lens L3 is set to equal to or larger than the lower limit of the conditional expression (5), it is possible to effectively correct aberrations (coma aberration, astigmatism aberration, distortion aberration) at the peripheral regions of the image plane that are away from the optical axis, by taking

TABLE 11 values satisfying conditional expressions

| | conditional expression (1) | conditional expression (2) | conditional expression (3) | conditional expression (4) | conditional expression (5) |
|---|---|---|---|---|---|
| Example 1 | 1.684 | 1.126 | −0.0050 | 0.0016 | 0.220 |
| Example 2 | 1.758 | 1.880 | −0.0032 | 0.0009 | 0.186 |
| Example 3 | 1.493 | 1.229 | −0.0020 | 0.0013 | 0.240 |
| Example 4 | 1.400 | 1.356 | −0.0027 | 0.0017 | 0.188 |
| Example 5 | 1.420 | 2.027 | −0.0014 | 0.0003 | 0.198 |
| Example 6 | 1.513 | 1.288 | −0.0021 | 0.0013 | 0.234 |
| Example 7 | 1.351 | 1.229 | −0.0024 | 0.0009 | 0.206 |
| Example 8 | 1.337 | 1.332 | −0.0011 | 0.0016 | 0.195 |
| Example 9 | 1.407 | 2.003 | −0.0013 | 0.0003 | 0.191 |
| Example 10 | 1.337 | 2.027 | −0.0021 | 0.0004 | 0.159 |

In the imaging lenses according to Examples 1 to 10, a chromatic aberration generated by the lens L1 having a positive refracting power is corrected by the lens L2 having a negative refracting power, and a chromatic aberration generated by the lens L3 having a positive refracting power is corrected by the lens L4 having a negative refracting power. Therefore, an image, whose chromatic aberrations have been corrected, can be picked up.

The imaging lenses according to Examples 1 to 10 satisfy the conditional expressions (1) to (5).

The conditional expression (1) defines the power balance of the first lens L1. In a case where the power balance value is larger than the upper limit of this expression, a large spherical aberration and a large chromatic aberration will occur and the performance will degenerate. To the contrary, in a case where the power balance value is smaller than the lower limit, the power of the first lens L1 is small, which requires the allover length of the lens system to be too large.

The conditional expression (2) defines the power balance of the third lens L3. In a case where the power balance value is larger than the upper limit of this expression, the power of the third lens L3 is large, which requires the back focus to be too short. In a case where the power balance value is smaller than the lower limit, the power of the third lens L3 is small, advantage of the difference of height at which an axial light ray and a peripheral light ray pass. The upper limit of the conditional expression (5) is a value for preventing the allover length of the lens system from being too large.

FIG. 11 to FIG. 20 each show one example of actually measured values of astigmatism, field curvature, and spherical aberration of one of the above-described examples. As can be seen from the aberration diagrams, all the aberrations are finely corrected. Hence, the imaging lenses according to Examples 1 to 10 of the present invention can be small-sized with the entire lens system saved in length, have fine conditions for the focal length, the F-number, and the field angle 2ω of the entire lens system, and can achieve a photographed image, whose chromatic aberration and aberrations (coma aberration, astigmatism aberration, distortion aberration, spherical aberration) at the periphery of the image plane away from the optical axis have been corrected.

Furthermore, the imaging lenses according to Example 5, 9, and 10, which have an aperture stop S between the first lens and the object, are more advantageous for being small-sized.

The imaging lenses having the above configuration can be used for arbitrary purposes.

An example, in which an imaging lens 100 is used as an imaging lens of a camera of a mobile terminal, will be explained below with reference to FIG. 21.

As shown in FIG. 21, the mobile terminal 200 includes an imaging lens 100 having the configuration described above, an imaging element 101, an image processing unit 102, a signal processing unit 103, a microphone 104, a speaker 105, a communication unit 106, a control unit 107, a display unit 108, an operation key unit 109, a storage unit 110, and a housing 111.

The imaging element 101 is constituted by a solid-state imaging element such as a Charge Coupled Device (CCD), a Complimentary Metal Oxide Semiconductor (CMOS) sensor, or the like, and has its imaging plane set on the image formation plane B of the imaging lens 100.

The image processing unit 102 processes an imaging signal supplied by the imaging element 101 into a frame-by-frame image signal, and supplies it to the control unit 107.

The microphone 104 collects voices of a calling party, converts them into electric signals, and supplies them to the signal processing unit 103.

The speaker 105 converts a sound signal supplied by the signal processing unit 103 into sounds and outputs them.

While a phone talk is made, the signal processing unit 103 generates a baseband signal from a voice signal supplied by the microphone 104 and supplies the baseband signal to the communication unit 106, or reproduces a voice signal from a baseband signal supplied by the communication unit 106 and supplies the reproduced signal to the speaker 105. While data communication is performed, the signal processing unit 103 generates a baseband signal from a data signal supplied by the control unit 107 and supplies the baseband signal to the communication unit 106, or reproduces a data signal from a baseband signal supplied by the communication unit 106 and supplies the reproduced signal to the control unit 107.

The communication unit 106 generates an transmitting signal from the baseband signal supplied by the signal processing unit 103, and sends out the transmitting signal via an antenna. The communication unit 106 receives a radio signal having a target frequency via the antenna, demodulates a baseband signal from the received signal, and supplies the baseband signal to the signal processing unit 103.

The control unit 107 is constituted by a one-chip processor or the like, and controls the entire mobile terminal 200.

The display unit 108 is constituted by a liquid crystal display device or the like, and displays a video supplied by the control unit 107, for example, a picked-up image.

The operation key unit 109 is constituted by a keyboard or the like, and enters an arbitrary instruction to the control unit 107.

The storage unit 110 stores operation programs of the control unit 107, images obtained by the image processing unit 102, data acquired from an external device via the communication unit 106, etc.

The housing 111 contains each of the above-described units 100 to 110. The housing 111 has an opening 111a from which the lens unit 100 is exposed to the outside.

In this configuration, the lens 100 forms an image of an object on the imaging plane of the imaging element 101. When the camera function is turned on, the imaging element 101 converts the object image into an electric signal (video signal) and supplies it to the image processing unit 102. The image processing unit 102 processes the supplied video signal to convert it into a video signal in a predetermined format, and supplies it to the control unit 107.

The control unit 107 supplies the video signal supplied thereto with the display unit 108 to display it as a so-called through image. The control unit 107 records a video signal in the storage unit 110 in response to an operation to a shutter button on the operation key unit 109.

The control unit 107 controls call making and call receiving in response to an instruction from the operation key unit 109. In a voice communication mode, the signal processing unit 103 processes a voice signal from the microphone 104, and sends a resultant signal via the communication unit 106. The signal processing unit 103 demodulates a voice signal that is received via the communication unit 106, and outputs voices from the speaker 105. In a data communication mode, the control unit 107 performs data communication with an external device via the signal processing unit 103 and the communication unit 106.

Since the mobile terminal 200 having this configuration uses the imaging lens 100, it can be saved in small size and yet can obtain an image, whose aberrations have been finely corrected.

The present invention can also be used for any other arbitrary purposes.

The present application claims priority to Japanese Patent Application No. 2006-346318 filed on Dec. 22, 2006, the disclosure of which is incorporated herein by reference in its entirety.

The invention claimed is:

1. An imaging lens, comprising a first lens, a second lens, a third lens, and a fourth lens that are arranged in this order from an object side,
   wherein the first lens has a biconvex shape and a positive refracting power,
   the second lens has a meniscus shape that is convex toward the object side, and has a negative refracting power,
   the third lens has a meniscus shape that is convex toward an image side, and has a positive refracting power, and
   the fourth lens has a meniscus shape that is convex toward the object side, and has a negative refracting power.

2. The imaging lens according to claim 1, which satisfies the following conditional expressions (1) to (5), which are $$1.3 < f/f1 < 1.8 \tag{1},$$

$$1.1 < f/f3 < 2.15 \tag{2},$$

$$-0.006 < 1/f1v1 + 1/f2v2 < 0 \tag{3},$$

$$0 < 1/f3v3 + 1/f4v4 < 0.002 \tag{4}, \text{ and}$$

$$0.15 < T23/TTL < 0.25 \tag{5},$$

where
   f: integral focal length of an entire lens system,
   f1: focal length of the first lens,
   f2: focal length of the second lens,
   f3: focal length of the third lens,
   f4: focal length of the fourth lens,
   v1: Abbe number of a d-line of the first lens,
   v2: Abbe number of a d-line of the second lens,
   v3: Abbe number of a d-line of the third lens,
   v4: Abbe number of a d-line of the fourth lens,
   T23: air distance between the second lens and the third lens, and
   TTL: distance between an apex of the first lens and an image formation plane.

3. The imaging lens according to claim 1, comprising an aperture stop that is arranged closer to the object side than the first lens is.

4. The imaging lens according to claim 1, comprising an aperture stop that is arranged between the first lens and the second lens.

5. The imaging lens according to claim 1,
wherein an integral focal length f of the first lens to the fourth lens satisfies a condition of 4.426 mm$\leqq$f$\leqq$4.896 mm.

6. The imaging lens according to claim 1,
wherein an integral F-number of the first lens to the fourth lens satisfies a condition of 2.8$\leqq$F$\leqq$3.0.

7. The imaging lens according to claim 1,
wherein an integral field angle 2$\omega$ of the first lens to the fourth lens satisfies a condition of 58.9°$\leqq$2$\omega$$\leqq$67.9°.

8. The imaging lens according to claim 1, comprising a parallel-plate glass that is arranged between the fourth lens and the image formation plane.

9. An imaging device, comprising:
the imaging lens according to claim 1; and
an imaging element that converts an object image formed by the imaging lens into an electric signal.

10. A mobile terminal apparatus, comprising the imaging device according to claim 9.

* * * * *